(12) United States Patent
Schmidt

(10) Patent No.: US 9,781,553 B2
(45) Date of Patent: Oct. 3, 2017

(54) LOCATION BASED SERVICES IN A DISTRIBUTED COMMUNICATION SYSTEM, AND RELATED COMPONENTS AND METHODS

(71) Applicant: Corning Cable Systems LLC, Hickory, NC (US)

(72) Inventor: Gerald Bernhart Schmidt, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 70 days.

(21) Appl. No.: 13/866,685

(22) Filed: Apr. 19, 2013

(65) Prior Publication Data

US 2013/0281125 A1   Oct. 24, 2013

Related U.S. Application Data

(60) Provisional application No. 61/637,458, filed on Apr. 24, 2012.

(51) Int. Cl.
*H04W 4/02* (2009.01)
*H04W 4/22* (2009.01)

(52) U.S. Cl.
CPC ............ *H04W 4/02* (2013.01); *H04W 4/22* (2013.01)

(58) Field of Classification Search
CPC .......... H04W 4/00; H04W 4/02; H04W 64/00
USPC .... 455/456.1–457; 398/20, 22, 23, 116, 117
See application file for complete search history.

(56) References Cited

U.S. PATENT DOCUMENTS

| | | | |
|---|---|---|---|
| 2,628,312 A | 2/1953 | Peterson et al. |
| 3,848,254 A | 11/1974 | Drebinger et al. |
| 3,986,182 A | 10/1976 | Hackett |
| 4,167,738 A | 9/1979 | Kirkendall |
| 4,449,246 A | 5/1984 | Seiler et al. |
| 4,573,212 A | 2/1986 | Lipsky |
| 4,665,560 A | 5/1987 | Lange |

(Continued)

FOREIGN PATENT DOCUMENTS

| | | | | |
|---|---|---|---|---|
| AU | 2010100320 A4 | 6/2010 | ............... | G01S 3/02 |
| CN | 1222007 A | 7/1999 | | |

(Continued)

OTHER PUBLICATIONS

Girard, et al., Indoor Pedestrian Navigation Using Foot-Mounted IMU and Portable Ultrasound Range Sensors, www.mdpi.com/journal/sensors, Aug. 2, 2011, pp. 7606-7624.

(Continued)

*Primary Examiner* — Kamran Afshar
*Assistant Examiner* — Farideh Madani
(74) *Attorney, Agent, or Firm* — C. Keith Montgomery

(57) ABSTRACT

Distributed communication systems provide location information to mobile terminals that may not be able to receive otherwise global positioning system (GPS) information from GPS satellites. Providing location information to clients inside a building or other location may make location based services, such as emergency (E911) services, possible based on the location information. The distributed communications system may be provided location information about its components through a number of techniques. Once the distributed communications system has the location information, such location information may be passed to clients.

9 Claims, 11 Drawing Sheets

(56) References Cited

U.S. PATENT DOCUMENTS

| | | |
|---|---|---|
| 4,935,746 A | 6/1990 | Wells |
| 4,939,852 A | 7/1990 | Brenner |
| 4,972,346 A | 11/1990 | Kawano et al. |
| 5,056,109 A | 10/1991 | Gilhousen et al. |
| 5,059,927 A | 10/1991 | Cohen |
| 5,187,803 A | 2/1993 | Sohner et al. |
| 5,206,655 A | 4/1993 | Caille et al. |
| 5,208,812 A | 5/1993 | Dudek et al. |
| 5,257,407 A | 10/1993 | Heinzelmann |
| 5,278,989 A | 1/1994 | Burke et al. |
| 5,280,472 A | 1/1994 | Gilhousen et al. |
| 5,339,259 A | 8/1994 | Puma et al. |
| 5,381,459 A | 1/1995 | Lappington |
| 5,396,224 A | 3/1995 | Dukes et al. |
| 5,420,863 A | 5/1995 | Taketsugu et al. |
| 5,513,176 A | 4/1996 | Dean et al. |
| 5,519,830 A | 5/1996 | Opoczynski |
| 5,544,173 A | 8/1996 | Meltzer |
| 5,602,903 A | 2/1997 | LeBlanc et al. ............... 379/60 |
| 5,606,725 A | 2/1997 | Hart |
| 5,615,132 A | 3/1997 | Horton et al. |
| 5,668,562 A | 9/1997 | Cutrer et al. |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,873,040 A | 2/1999 | Dunn et al. .................. 455/456 |
| 5,953,670 A | 9/1999 | Newson et al. |
| 5,969,837 A | 10/1999 | Farber et al. |
| 5,983,070 A | 11/1999 | Georges et al. |
| 6,006,069 A | 12/1999 | Langston |
| 6,011,962 A | 1/2000 | Lindenmeier et al. |
| 6,011,980 A | 1/2000 | Nagano et al. |
| 6,014,546 A | 1/2000 | Georges et al. |
| 6,037,898 A | 3/2000 | Parish et al. |
| 6,046,838 A | 4/2000 | Kou et al. |
| 6,069,721 A | 5/2000 | Oh et al. |
| 6,108,536 A | 8/2000 | Yafuso et al. |
| 6,118,767 A | 9/2000 | Shen et al. |
| 6,122,529 A | 9/2000 | Sabat, Jr. et al. |
| 6,128,470 A | 10/2000 | Naidu et al. |
| 6,128,477 A | 10/2000 | Freed |
| 6,157,810 A | 12/2000 | Georges et al. |
| 6,178,334 B1 | 1/2001 | Shyy et al. |
| 6,192,216 B1 | 2/2001 | Sabat, Jr. et al. |
| 6,194,968 B1 | 2/2001 | Winslow |
| 6,195,561 B1 | 2/2001 | Rose |
| 6,212,397 B1 | 4/2001 | Langston et al. |
| 6,218,979 B1 | 4/2001 | Barnes et al. |
| 6,222,503 B1 | 4/2001 | Gietema et al. |
| 6,223,201 B1 | 4/2001 | Reznak |
| 6,236,365 B1 | 5/2001 | LeBlanc et al. ............... 342/457 |
| 6,236,863 B1 | 5/2001 | Waldroup et al. |
| 6,249,252 B1 | 6/2001 | Dupray ......................... 342/450 |
| 6,253,067 B1 | 6/2001 | Tsuji |
| 6,275,990 B1 | 8/2001 | Dapper et al. |
| 6,279,158 B1 | 8/2001 | Geile et al. |
| 6,286,163 B1 | 9/2001 | Trimble |
| 6,295,451 B1 | 9/2001 | Mimura |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,437,577 B1 | 8/2002 | Fritzmann et al. |
| 6,448,558 B1 | 9/2002 | Greene |
| 6,452,915 B1 | 9/2002 | Jorgensen |
| 6,480,702 B1 | 11/2002 | Sabat, Jr. |
| 6,490,439 B1 | 12/2002 | Croft et al. |
| 6,518,916 B1 | 2/2003 | Ashihara et al. |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,580,402 B2 | 6/2003 | Navarro et al. |
| 6,580,905 B1 | 6/2003 | Naidu et al. |
| 6,587,514 B1 | 7/2003 | Wright et al. |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,678,509 B2 | 1/2004 | Skarman et al. |
| 6,704,298 B1 | 3/2004 | Matsumiya et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,763,226 B1 | 7/2004 | McZeal, Jr. |
| 6,771,933 B1 | 8/2004 | Eng et al. |
| 6,782,048 B2 | 8/2004 | Santhoff |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler et al. |
| 6,876,056 B2 | 4/2005 | Tilmans et al. |
| 6,876,945 B2 | 4/2005 | Emord .......................... 702/150 |
| 6,882,311 B2 | 4/2005 | Walker et al. |
| 6,885,344 B2 | 4/2005 | Mohamadi |
| 6,889,060 B2 | 5/2005 | Fernando et al. |
| 6,900,732 B2 | 5/2005 | Richards |
| 6,906,681 B2 | 6/2005 | Hoppenstein |
| 6,909,399 B1 | 6/2005 | Zegelin et al. ............... 342/463 |
| 6,915,529 B1 | 7/2005 | Suematsu et al. |
| 6,919,858 B2 | 7/2005 | Rofougaran |
| 6,928,281 B2 | 8/2005 | Ward et al. |
| 6,931,659 B1 | 8/2005 | Kinemura |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,952,181 B2 | 10/2005 | Karr et al. .................... 342/457 |
| 6,961,312 B2 | 11/2005 | Kubler et al. |
| 6,963,727 B2 | 11/2005 | Shreve |
| 6,967,347 B2 | 11/2005 | Estes et al. |
| 6,977,502 B1 | 12/2005 | Hertz |
| 6,983,174 B2 | 1/2006 | Hoppenstein et al. |
| 7,002,511 B1 | 2/2006 | Ammar et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,594 B2 | 4/2006 | Wallace et al. |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,838 B2 | 5/2006 | Judd |

(56) References Cited

U.S. PATENT DOCUMENTS

| | | | |
|---|---|---|---|
| 7,069,577 | B2 | 6/2006 | Geile et al. |
| 7,072,586 | B2 | 7/2006 | Aburakawa et al. |
| 7,084,758 | B1 | 8/2006 | Cole |
| 7,103,119 | B2 | 9/2006 | Matsuoka et al. |
| 7,103,377 | B2 | 9/2006 | Bauman et al. |
| 7,110,795 | B2 | 9/2006 | Doi |
| 7,113,780 | B2 | 9/2006 | McKenna et al. |
| 7,129,886 | B2 | 10/2006 | Hall et al. |
| 7,142,535 | B2 | 11/2006 | Kubler et al. |
| 7,142,619 | B2 | 11/2006 | Sommer et al. |
| 7,146,134 | B2 | 12/2006 | Moon et al. |
| 7,171,244 | B2 | 1/2007 | Bauman |
| 7,177,623 | B2 | 2/2007 | Baldwin |
| 7,183,910 | B2 | 2/2007 | Alvarez et al. |
| 7,184,728 | B2 | 2/2007 | Solum |
| 7,190,748 | B2 | 3/2007 | Kim et al. |
| 7,194,023 | B2 | 3/2007 | Norrell et al. |
| 7,194,275 | B2 | 3/2007 | Bolin et al. ............... 455/456.6 |
| 7,196,656 | B2 | 3/2007 | Shirakawa |
| 7,199,443 | B2 | 4/2007 | Elsharawy |
| 7,233,771 | B2 | 6/2007 | Proctor, Jr. et al. |
| 7,256,727 | B2 | 8/2007 | Fullerton et al. |
| 7,260,369 | B2 | 8/2007 | Feher |
| 7,272,359 | B2 | 9/2007 | Li et al. |
| 7,280,011 | B2 | 10/2007 | Bayar et al. |
| 7,298,327 | B2 | 11/2007 | Dupray et al. ............... 342/451 |
| 7,315,735 | B2 | 1/2008 | Graham ............... 455/404.1 |
| 7,324,476 | B2 | 1/2008 | Agrawal et al. |
| 7,324,837 | B2 | 1/2008 | Yamakita |
| 7,336,961 | B1 | 2/2008 | Ngan ............... 455/456.1 |
| 7,348,843 | B1 | 3/2008 | Qiu et al. |
| 7,359,674 | B2 | 4/2008 | Markki et al. |
| 7,359,718 | B2 | 4/2008 | Tao et al. |
| 7,366,151 | B2 | 4/2008 | Kubler et al. |
| 7,369,526 | B2 | 5/2008 | Lechleider et al. |
| 7,385,384 | B2 | 6/2008 | Rocher |
| 7,388,892 | B2 | 6/2008 | Nishiyama et al. |
| 7,392,025 | B2 | 6/2008 | Rooyen et al. |
| 7,395,181 | B2 | 7/2008 | Foxlin ............... 702/155 |
| 7,412,224 | B2 | 8/2008 | Kotola et al. |
| 7,421,288 | B2 | 9/2008 | Funakubo |
| 7,450,853 | B2 | 11/2008 | Kim et al. |
| 7,451,365 | B2 | 11/2008 | Wang et al. |
| 7,454,222 | B2 | 11/2008 | Huang et al. |
| 7,460,507 | B2 | 12/2008 | Kubler et al. |
| 7,471,243 | B2 | 12/2008 | Roslak |
| 7,483,711 | B2 | 1/2009 | Burchfiel |
| 7,495,560 | B2 | 2/2009 | Easton et al. |
| 7,505,747 | B2 | 3/2009 | Solum |
| 7,512,419 | B2 | 3/2009 | Solum |
| 7,512,450 | B2 | 3/2009 | Ahmed |
| 7,525,484 | B2 | 4/2009 | Dupray et al. ............... 342/450 |
| 7,535,796 | B2 | 5/2009 | Holm et al. |
| 7,539,509 | B2 | 5/2009 | Bauman et al. |
| 7,542,452 | B2 | 6/2009 | Penumetsa |
| 7,546,138 | B2 | 6/2009 | Bauman |
| 7,548,138 | B2 | 6/2009 | Kamgaing |
| 7,548,833 | B2 | 6/2009 | Ahmed |
| 7,551,641 | B2 | 6/2009 | Pirzada et al. |
| 7,557,758 | B2 | 7/2009 | Rofougaran |
| 7,580,384 | B2 | 8/2009 | Kubler et al. |
| 7,586,861 | B2 | 9/2009 | Kubler et al. |
| 7,590,354 | B2 | 9/2009 | Sauer et al. |
| 7,593,704 | B2 | 9/2009 | Pinel et al. |
| 7,599,420 | B2 | 10/2009 | Forenza et al. |
| 7,599,672 | B2 | 10/2009 | Shoji et al. |
| 7,610,046 | B2 | 10/2009 | Wala |
| 7,627,218 | B2 | 12/2009 | Hurley |
| 7,627,250 | B2 | 12/2009 | George et al. |
| 7,630,690 | B2 | 12/2009 | Kaewell, Jr. et al. |
| 7,633,934 | B2 | 12/2009 | Kubler et al. |
| 7,639,982 | B2 | 12/2009 | Wala |
| 7,646,743 | B2 | 1/2010 | Kubler et al. |
| 7,646,777 | B2 | 1/2010 | Hicks, III et al. |
| 7,653,397 | B2 | 1/2010 | Pernu et al. |
| 7,668,565 | B2 | 2/2010 | Ylänen et al. |
| 7,679,562 | B2 | 3/2010 | Shirakawa |
| 7,688,811 | B2 | 3/2010 | Kubler et al. |
| 7,693,486 | B2 | 4/2010 | Kasslin et al. |
| 7,693,654 | B1 | 4/2010 | Dietsch et al. |
| 7,697,467 | B2 | 4/2010 | Kubler et al. |
| 7,697,574 | B2 | 4/2010 | Suematsu et al. |
| 7,698,228 | B2 | 4/2010 | Gailey et al. |
| 7,714,778 | B2 | 5/2010 | Dupray ............... 342/357.01 |
| 7,715,375 | B2 | 5/2010 | Kubler et al. |
| 7,751,374 | B2 | 7/2010 | Donovan |
| 7,751,838 | B2 | 7/2010 | Ramesh et al. |
| 7,751,971 | B2 | 7/2010 | Chang et al. |
| 7,760,703 | B2 | 7/2010 | Kubler et al. |
| 7,764,231 | B1 | 7/2010 | Karr et al. ............... 342/457 |
| 7,768,951 | B2 | 8/2010 | Kubler et al. |
| 7,773,573 | B2 | 8/2010 | Chung et al. |
| 7,778,603 | B2 | 8/2010 | Palin et al. |
| 7,787,823 | B2 | 8/2010 | George et al. |
| 7,787,887 | B2 | 8/2010 | Gupta et al. |
| 7,809,012 | B2 | 10/2010 | Ruuska et al. |
| 7,812,766 | B2 | 10/2010 | Leblanc et al. |
| 7,812,775 | B2 | 10/2010 | Babakhani et al. |
| 7,817,969 | B2 | 10/2010 | Castaneda et al. |
| 7,835,328 | B2 | 11/2010 | Stephens et al. |
| 7,848,316 | B2 | 12/2010 | Kubler et al. |
| 7,848,654 | B2 | 12/2010 | Sauer et al. |
| 7,848,765 | B2 | 12/2010 | Phillips et al. |
| 7,848,770 | B2 | 12/2010 | Scheinert |
| 7,853,234 | B2 | 12/2010 | Afsahi |
| 7,860,518 | B2 | 12/2010 | Flanagan et al. .......... 455/456.1 |
| 7,860,519 | B2 | 12/2010 | Portman et al. |
| 7,864,673 | B2 | 1/2011 | Bonner |
| 7,870,321 | B2 | 1/2011 | Rofougaran |
| 7,880,677 | B2 | 2/2011 | Rofougaran et al. |
| 7,881,665 | B2 | 2/2011 | Symons |
| 7,881,755 | B1 | 2/2011 | Mishra et al. |
| 7,894,423 | B2 | 2/2011 | Kubler et al. |
| 7,899,007 | B2 | 3/2011 | Kubler et al. |
| 7,903,029 | B2 | 3/2011 | Dupray ............... 342/457 |
| 7,907,972 | B2 | 3/2011 | Walton et al. |
| 7,912,043 | B2 | 3/2011 | Kubler et al. |
| 7,912,506 | B2 | 3/2011 | Lovberg et al. |
| 7,916,066 | B1 | 3/2011 | Osterweil |
| 7,916,706 | B2 | 3/2011 | Kubler et al. |
| 7,917,177 | B2 | 3/2011 | Bauman |
| 7,920,553 | B2 | 4/2011 | Kubler et al. |
| 7,920,858 | B2 | 4/2011 | Sabat, Jr. et al. |
| 7,924,783 | B1 | 4/2011 | Mahany et al. |
| 7,936,713 | B2 | 5/2011 | Kubler et al. |
| 7,949,364 | B2 | 5/2011 | Kasslin et al. |
| 7,952,512 | B1 | 5/2011 | Delker et al. |
| 7,957,777 | B1 | 6/2011 | Vu et al. |
| 7,962,111 | B2 | 6/2011 | Solum |
| 7,969,009 | B2 | 6/2011 | Chandrasekaran |
| 7,969,911 | B2 | 6/2011 | Mahany et al. |
| 7,970,648 | B2 | 6/2011 | Gailey et al. |
| 7,990,925 | B2 | 8/2011 | Tinnakornsrisuphap et al. |
| 7,996,020 | B1 | 8/2011 | Chhabra |
| 7,996,281 | B2 | 8/2011 | Alvarez et al. |
| 8,005,050 | B2 | 8/2011 | Scheinert et al. |
| 8,018,907 | B2 | 9/2011 | Kubler et al. |
| 8,023,886 | B2 | 9/2011 | Rofougaran |
| 8,027,656 | B2 | 9/2011 | Rofougaran et al. |
| 8,032,153 | B2 | 10/2011 | Dupray et al. |
| 8,036,308 | B2 | 10/2011 | Rofougaran |
| 8,072,381 | B1 | 12/2011 | Ziegler ............... 342/386 |
| 8,073,565 | B2 | 12/2011 | Johnson |
| 8,081,923 | B1 | 12/2011 | Larsen et al. ............... 455/18 |
| 8,082,096 | B2 | 12/2011 | Dupray ............... 701/207 |
| 8,082,353 | B2 | 12/2011 | Huber et al. |
| 8,086,192 | B2 | 12/2011 | Rofougaran et al. |
| 8,090,383 | B1 | 1/2012 | Emigh et al. |
| 8,111,998 | B2 | 2/2012 | George et al. |
| 8,135,413 | B2 | 3/2012 | Dupray ............... 455/456.1 |
| 8,203,910 | B2 | 6/2012 | Zhao et al. |
| 8,213,264 | B2 | 7/2012 | Lee et al. |
| 8,326,315 | B2 | 12/2012 | Phillips et al. |
| 8,364,171 | B2 | 1/2013 | Busch |

(56) References Cited

U.S. PATENT DOCUMENTS

| | | |
|---|---|---|
| 8,442,556 B2 | 5/2013 | Rawat et al. |
| 8,570,914 B2 | 10/2013 | Sauer |
| 8,604,909 B1 | 12/2013 | Amir et al. |
| 8,774,843 B2 | 7/2014 | Mangold et al. ......... 455/456.5 |
| 8,983,301 B2 | 3/2015 | Baker et al. |
| RE45,505 E | 5/2015 | Scheinert et al. |
| 9,184,843 B2 | 11/2015 | Berlin et al. |
| 2001/0022782 A1 | 9/2001 | Steudle |
| 2001/0036199 A1 | 11/2001 | Terry |
| 2002/0051434 A1 | 5/2002 | Ozluturk et al. |
| 2002/0123365 A1 | 9/2002 | Thorson et al. |
| 2002/0128009 A1 | 9/2002 | Boch et al. |
| 2003/0078074 A1 | 4/2003 | Sesay et al. |
| 2003/0083052 A1 | 5/2003 | Hosaka |
| 2003/0142587 A1 | 7/2003 | Zeitzew |
| 2003/0146871 A1 | 8/2003 | Karr et al. .................... 342/457 |
| 2003/0157943 A1 | 8/2003 | Sabat, Jr. ...................... 455/456 |
| 2003/0220835 A1 | 11/2003 | Barnes, Jr. |
| 2004/0022215 A1 | 2/2004 | Okuhata et al. |
| 2004/0095907 A1 | 5/2004 | Agee et al. |
| 2004/0102196 A1 | 5/2004 | Weckstrom et al. ...... 454/456.1 |
| 2004/0131025 A1 | 7/2004 | Dohler et al. |
| 2004/0139477 A1 | 7/2004 | Russell et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0165573 A1 | 8/2004 | Kubler et al. |
| 2004/0175173 A1 | 9/2004 | Deas |
| 2004/0179852 A1 | 9/2004 | Westbrook et al. |
| 2004/0196404 A1 | 10/2004 | Loheit et al. |
| 2004/0198386 A1 | 10/2004 | Dupray ...................... 455/456.1 |
| 2004/0235497 A1 | 11/2004 | Zekavat |
| 2004/0246926 A1 | 12/2004 | Belcea et al. |
| 2005/0003873 A1 | 1/2005 | Naidu et al. |
| 2005/0020309 A1 | 1/2005 | Moeglein et al. ......... 455/456.1 |
| 2005/0102180 A1 | 5/2005 | Gailey et al. |
| 2005/0143091 A1* | 6/2005 | Shapira ................. H04W 64/00 |
| | | 455/456.1 |
| 2005/0147071 A1 | 7/2005 | Karaoguz et al. |
| 2005/0148306 A1 | 7/2005 | Hiddink |
| 2005/0153712 A1 | 7/2005 | Osaka et al. ............... 455/456.5 |
| 2005/0246094 A1 | 11/2005 | Moscatiello |
| 2005/0272439 A1 | 12/2005 | Picciriello et al. |
| 2005/0281213 A1 | 12/2005 | Dohn |
| 2006/0014548 A1 | 1/2006 | Bolin et al. ................ 455/456.1 |
| 2006/0025158 A1 | 2/2006 | Leblanc et al. ............ 455/456.2 |
| 2006/0033662 A1 | 2/2006 | Ward et al. |
| 2006/0056327 A1 | 3/2006 | Coersmeier |
| 2006/0092880 A1 | 5/2006 | Nounin et al. |
| 2006/0136544 A1 | 6/2006 | Atsmon et al. |
| 2006/0183504 A1 | 8/2006 | Tanaka et al. |
| 2006/0209752 A1 | 9/2006 | Wijngaarden et al. ....... 370/328 |
| 2006/0223439 A1 | 10/2006 | Pinel et al. |
| 2006/0274704 A1 | 12/2006 | Desai et al. |
| 2006/0276202 A1 | 12/2006 | Moeglein et al. ......... 455/456.1 |
| 2007/0004437 A1 | 1/2007 | Harada et al. |
| 2007/0054682 A1 | 3/2007 | Fanning et al. |
| 2007/0057761 A1 | 3/2007 | Johnson |
| 2007/0060045 A1 | 3/2007 | Prautzsch |
| 2007/0060055 A1 | 3/2007 | Desai et al. |
| 2007/0070812 A1 | 3/2007 | Lee |
| 2007/0076649 A1 | 4/2007 | Lin et al. |
| 2007/0093273 A1 | 4/2007 | Cai |
| 2007/0104128 A1 | 5/2007 | Laroia et al. .................. 370/329 |
| 2007/0104164 A1 | 5/2007 | Laroia et al. .................. 370/338 |
| 2007/0140168 A1 | 6/2007 | Laroia et al. .................. 370/330 |
| 2007/0172241 A1 | 7/2007 | Kwon et al. |
| 2007/0202844 A1 | 8/2007 | Wilson et al. |
| 2007/0224954 A1 | 9/2007 | Gopi |
| 2007/0253355 A1 | 11/2007 | Hande et al. .................. 371/328 |
| 2007/0257796 A1 | 11/2007 | Easton et al. |
| 2007/0268846 A1 | 11/2007 | Proctor, Jr. et al. |
| 2007/0268853 A1 | 11/2007 | Ma et al. ....................... 370/328 |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0013482 A1 | 1/2008 | Kurokawa |
| 2008/0043714 A1 | 2/2008 | Pernu |
| 2008/0058018 A1 | 3/2008 | Scheinert |
| 2008/0063397 A1 | 3/2008 | Hu et al. |
| 2008/0077326 A1 | 3/2008 | Funk et al. .................... 701/220 |
| 2008/0080863 A1 | 4/2008 | Sauer et al. |
| 2008/0098203 A1 | 4/2008 | Master et al. |
| 2008/0101277 A1* | 5/2008 | Taylor .................... G01S 5/0289 |
| | | 370/328 |
| 2008/0118014 A1 | 5/2008 | Reunamaki et al. |
| 2008/0119208 A1 | 5/2008 | Flanagan et al. ........... 455/456.6 |
| 2008/0129634 A1 | 6/2008 | Pera et al. |
| 2008/0134194 A1 | 6/2008 | Liu |
| 2008/0167049 A1 | 7/2008 | Karr et al. .................. 455/456.2 |
| 2008/0194226 A1 | 8/2008 | Rivas et al. ................ 455/404.2 |
| 2008/0201226 A1 | 8/2008 | Carlson et al. |
| 2008/0207253 A1 | 8/2008 | Jaakkola et al. |
| 2008/0232328 A1* | 9/2008 | Scheinert .................... G01S 5/02 |
| | | 370/335 |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0270522 A1 | 10/2008 | Souissi |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0310341 A1 | 12/2008 | Koyanagi |
| 2008/0310464 A1 | 12/2008 | Schneider |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0046688 A1 | 2/2009 | Volpi et al. |
| 2009/0059903 A1 | 3/2009 | Kubler et al. |
| 2009/0061796 A1 | 3/2009 | Arkko et al. |
| 2009/0073054 A1 | 3/2009 | Yoon et al. |
| 2009/0073885 A1 | 3/2009 | Jalil et al. |
| 2009/0073916 A1 | 3/2009 | Zhang et al. |
| 2009/0088071 A1 | 4/2009 | Rofougaran |
| 2009/0141780 A1 | 6/2009 | Cruz-Albrecht et al. |
| 2009/0143076 A1 | 6/2009 | Wachter et al. |
| 2009/0149221 A1 | 6/2009 | Liu et al. |
| 2009/0154294 A1 | 6/2009 | Jeong et al. |
| 2009/0163224 A1 | 6/2009 | Dean et al. ................. 455/456.1 |
| 2009/0175214 A1 | 7/2009 | Sfar et al. |
| 2009/0176507 A1 | 7/2009 | Wu et al. ................... 455/456.2 |
| 2009/0190441 A1 | 7/2009 | Zhao et al. |
| 2009/0191891 A1 | 7/2009 | Ma et al. .................... 455/456.1 |
| 2009/0216449 A1 | 8/2009 | Erko et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0238566 A1 | 9/2009 | Boldi et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0262604 A1 | 10/2009 | Funada |
| 2009/0278596 A1 | 11/2009 | Rofougaran et al. |
| 2009/0279593 A1 | 11/2009 | Rofougaran et al. |
| 2009/0280835 A1 | 11/2009 | Males et al. |
| 2009/0285147 A1 | 11/2009 | Subasic et al. |
| 2009/0316529 A1 | 12/2009 | Huuskonen et al. |
| 2010/0002626 A1 | 1/2010 | Schmidt et al. |
| 2010/0007485 A1 | 1/2010 | Kodrin et al. ........... 340/539.13 |
| 2010/0008337 A1 | 1/2010 | Bajko |
| 2010/0027443 A1 | 2/2010 | LoGalbo et al. |
| 2010/0048163 A1 | 2/2010 | Parr et al. |
| 2010/0056200 A1 | 3/2010 | Tolonen |
| 2010/0061291 A1 | 3/2010 | Wala |

(56) References Cited

U.S. PATENT DOCUMENTS

| | | |
|---|---|---|
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0097268 A1 | 4/2010 | Roh |
| 2010/0118864 A1 | 5/2010 | Kubler et al. |
| 2010/0121567 A1 | 5/2010 | Mendelson |
| 2010/0127937 A1 | 5/2010 | Chandrasekaran et al. |
| 2010/0128568 A1 | 5/2010 | Han et al. ............... 367/99 |
| 2010/0130233 A1 | 5/2010 | Parker |
| 2010/0134257 A1 | 6/2010 | Puleston et al. |
| 2010/0135178 A1 | 6/2010 | Aggarwal et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0151821 A1 | 6/2010 | Sweeney et al. |
| 2010/0156721 A1 | 6/2010 | Alamouti et al. |
| 2010/0157738 A1 | 6/2010 | Izumi et al. |
| 2010/0159859 A1 | 6/2010 | Rofougaran |
| 2010/0178936 A1 | 7/2010 | Wala et al. ............... 455/456.2 |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. ............... 455/456.1 |
| 2010/0246558 A1 | 9/2010 | Harel |
| 2010/0254356 A1 | 10/2010 | Tynderfeldt et al. |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0273504 A1 | 10/2010 | Bull et al. ............... 455/456.1 |
| 2010/0284323 A1 | 11/2010 | Tang et al. |
| 2010/0287011 A1 | 11/2010 | Muchkaev |
| 2010/0290355 A1 | 11/2010 | Roy et al. |
| 2010/0291949 A1 | 11/2010 | Shapira et al. ............ 455/456.1 |
| 2010/0309049 A1 | 12/2010 | Reunamäki et al. |
| 2010/0309752 A1 | 12/2010 | Lee et al. ............... 367/99 |
| 2010/0311472 A1 | 12/2010 | Rofougaran et al. |
| 2010/0311480 A1 | 12/2010 | Raines et al. |
| 2010/0317371 A1 | 12/2010 | Westerinen et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. ............... 398/58 |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028157 A1 | 2/2011 | Larsen ............... 455/456.1 |
| 2011/0028161 A1 | 2/2011 | Larsen ............... 455/456.1 |
| 2011/0035284 A1 | 2/2011 | Moshfeghi |
| 2011/0050501 A1 | 3/2011 | Aljadeff ............... 342/387 |
| 2011/0065450 A1 | 3/2011 | Kazmi |
| 2011/0066774 A1 | 3/2011 | Rofougaran |
| 2011/0068981 A1 | 3/2011 | Marks et al. |
| 2011/0069668 A1 | 3/2011 | Chion et al. |
| 2011/0071734 A1 | 3/2011 | Van Wiemeersch et al. |
| 2011/0071785 A1 | 3/2011 | Heath |
| 2011/0086614 A1 | 4/2011 | Brisebois et al. ............ 455/411 |
| 2011/0116572 A1 | 5/2011 | Lee et al. |
| 2011/0122912 A1 | 5/2011 | Benjamin et al. |
| 2011/0124347 A1 | 5/2011 | Chen et al. ............... 455/456.1 |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. ............... 45/442 |
| 2011/0159891 A1 | 6/2011 | Segall et al. ............... 455/456.3 |
| 2011/0171912 A1 | 7/2011 | Beck et al. ............... 455/67.11 |
| 2011/0171946 A1 | 7/2011 | Soehren ............... 455/418 |
| 2011/0171973 A1 | 7/2011 | Beck et al. ............... 455/456.2 |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0210843 A1 | 9/2011 | Kummetz ............... 340/517 |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. ............ 455/456.2 |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268452 A1* | 11/2011 | Beamon ............ G02B 6/0288 398/117 |
| 2011/0274021 A1 | 11/2011 | He et al. |
| 2011/0279445 A1 | 11/2011 | Murphy et al. |
| 2011/0281536 A1 | 11/2011 | Lee et al. |
| 2011/0312340 A1 | 12/2011 | Wu et al. ............... 455/456.1 |
| 2012/0028649 A1 | 2/2012 | Gupta et al. |
| 2012/0039320 A1 | 2/2012 | Lemson et al. ............... 370/338 |
| 2012/0046049 A1 | 2/2012 | Curtis et al. |
| 2012/0058775 A1 | 3/2012 | Dupray et al. ............ 455/456.1 |
| 2012/0065926 A1 | 3/2012 | Lee et al. |
| 2012/0072106 A1 | 3/2012 | Han et al. |
| 2012/0081248 A1 | 4/2012 | Kennedy et al. ............ 342/118 |
| 2012/0084177 A1 | 4/2012 | Tanaka et al. |
| 2012/0087212 A1 | 4/2012 | Vartanian et al. ............ 367/118 |
| 2012/0095779 A1 | 4/2012 | Wengrovitz et al. |
| 2012/0108258 A1 | 5/2012 | Li |
| 2012/0130632 A1 | 5/2012 | Bandyopadhyay et al. .. 701/446 |
| 2012/0135755 A1 | 5/2012 | Lee et al. |
| 2012/0158297 A1 | 6/2012 | Kim et al. |
| 2012/0158509 A1 | 6/2012 | Zivkovic et al. |
| 2012/0179548 A1 | 7/2012 | Sun et al. |
| 2012/0179549 A1 | 7/2012 | Sigmund et al. |
| 2012/0179561 A1 | 7/2012 | Sun et al. |
| 2012/0196626 A1 | 8/2012 | Fano et al. |
| 2012/0215438 A1 | 8/2012 | Liu et al. |
| 2012/0221392 A1 | 8/2012 | Baker et al. |
| 2012/0232917 A1 | 9/2012 | Al-Khudairy et al. |
| 2012/0243469 A1 | 9/2012 | Klein |
| 2012/0303446 A1 | 11/2012 | Busch |
| 2012/0303455 A1 | 11/2012 | Busch |
| 2012/0309336 A1 | 12/2012 | Tanaka et al. |
| 2012/0310836 A1 | 12/2012 | Eden et al. |
| 2013/0006663 A1 | 1/2013 | Bertha et al. |
| 2013/0006849 A1 | 1/2013 | Morris |
| 2013/0036012 A1 | 2/2013 | Lin et al. |
| 2013/0040654 A1 | 2/2013 | Parish |
| 2013/0041761 A1* | 2/2013 | Voda ............ G06Q 30/0259 705/14.68 |
| 2013/0045758 A1 | 2/2013 | Khorashadi et al. |
| 2013/0046691 A1 | 2/2013 | Culton |
| 2013/0066821 A1 | 3/2013 | Moore et al. |
| 2013/0073336 A1 | 3/2013 | Heath |
| 2013/0073377 A1 | 3/2013 | Heath |
| 2013/0073388 A1 | 3/2013 | Heath |
| 2013/0073422 A1 | 3/2013 | Moore et al. |
| 2013/0080578 A1 | 3/2013 | Murad et al. |
| 2013/0084859 A1 | 4/2013 | Azar |
| 2013/0116922 A1 | 5/2013 | Cai et al. |
| 2013/0131972 A1 | 5/2013 | Kumar et al. |
| 2013/0157664 A1 | 6/2013 | Chow et al. |
| 2013/0314210 A1 | 11/2013 | Schoner et al. |
| 2013/0322214 A1 | 12/2013 | Neukirch et al. |
| 2013/0322415 A1 | 12/2013 | Chamarti et al. ............ 370/338 |
| 2014/0050482 A1 | 2/2014 | Berlin et al. |
| 2014/0112667 A1 | 4/2014 | Neukirch et al. |
| 2014/0180581 A1 | 6/2014 | Berlin et al. |
| 2014/0213285 A1 | 7/2014 | Sauer |
| 2014/0233548 A1 | 8/2014 | Leizerovich et al. |
| 2014/0323150 A1 | 10/2014 | Mangold et al. ............ 455/456.1 |
| 2015/0087329 A1 | 3/2015 | Stratford et al. |

(56) References Cited

U.S. PATENT DOCUMENTS

| | | | |
|---|---|---|---|
| 2015/0155942 A1 | 6/2015 | Baker et al. | |
| 2015/0268327 A1 | 9/2015 | Neukirch et al. | |
| 2015/0317557 A1 | 11/2015 | Julian et al. | |

FOREIGN PATENT DOCUMENTS

| | | | |
|---|---|---|---|
| CN | 1242911 A | 1/2000 | |
| EP | 0732827 A2 | 9/1996 | |
| EP | 0851618 A2 | 7/1998 | |
| EP | 1124211 A2 | 8/2001 | |
| EP | 1227605 A2 | 7/2002 | |
| EP | 1347584 A2 | 9/2003 | |
| EP | 1448008 A1 | 8/2004 | |
| EP | 1005774 B1 | 3/2007 | |
| EP | 1954019 A1 | 8/2008 | |
| EP | 2192811 A1 | 6/2010 | |
| JP | 2002353813 A | 12/2002 | |
| JP | 2009288245 | 12/2009 | ........... G01S 1/80 |
| JP | 2009288245 A | 12/2009 | |
| WO | 9603823 A1 | 2/1996 | |
| WO | 9953838 A1 | 10/1999 | |
| WO | 0072475 A1 | 11/2000 | |
| WO | 02087275 A2 | 10/2002 | |
| WO | 03024027 A1 | 3/2003 | |
| WO | 2005060338 A2 | 7/2005 | |
| WO | 2006076600 A1 | 7/2006 | |
| WO | WO 2006076600 A1 * | 7/2006 | ......... H04L 12/2854 |
| WO | WO2008/099383 A2 | 8/2008 | ........... H04B 7/04 |
| WO | WO2008/099390 A3 | 8/2008 | ........... G01S 3/02 |
| WO | WO2009/081376 A3 | 7/2009 | ........ H04W 24/00 |
| WO | WO2009/097237 A1 | 8/2009 | ........... G01S 1/68 |
| WO | 2010090999 A1 | 8/2010 | |
| WO | WO2011/017700 A1 | 2/2011 | ........... H04B 7/02 |
| WO | WO2011/091859 A1 | 8/2011 | ........ H04W 64/00 |
| WO | WO2011/123336 A1 | 10/2011 | ......... H04B 10/12 |

OTHER PUBLICATIONS

Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.
Mokni, et al., "Couples sonar inertial navigation system for pedestrian tracking," 8 pages.
"Safe Campus Solutions: Going Beyond Emergency Notification," www.alcatel-lucent.com, 8 pages.
"Cellular Specialties Introduces the First Simulcasted In-building Location-Based Tracking Solution," http://smart-grid.tmcnet.com/news/2009/09/14/4368300.htm, 2 pages.
Non-final Office Action for U.S. Appl. No. 13/628,497 dated Apr. 24, 2014, 15 pages.
Krempels et al., "Directory-Less Indoor Positioning for WLAN Infrastructures extended abstract," IEEE Symposium International on Consumer Electronics, Apr. 14-16, 2008, Vilamoura, Portugal, 2 pages.
International Search Report for International Patent Application PCT/US2013/043230 dated Dec. 4, 2013, 5 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Cho et al. "The Forward Link Performance of a PCS System with an AGC," 4th CDMA International Conference and Exhibition, "The Realization of IMT-2000," 1999, pp. 236-240, vol. 2.
Chu, Ta-Shing S. et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE Radio Frequency Integrated Circuits (RFIC) Symposium, Anaheim, California, Jun. 13-15, 1999, pp. 197-200.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
Gansemer, Sebastian et al., "RSSI-based Euclidean Distance Algorithm for Indoor Positioning adapted for the use in dynamically changing WLAN environments and multi-level buildings," International Conference on Indoor Positioning and Indoor Navigation (IPIN), Sep. 15-17, 2010, Zurich, Switzerland, 2 pages.
Author Unknown, "CDMA Co-Pilot Transmitter," Product Specifications, Cellular Specialties, Inc., 021-0000-001 Mktg Rev 2, Aug. 2009, www.cellularspecialties.com, 2 pages.
International Search Report and Written Opinion for PCT/US2011/029895 dated Jul. 4, 2011, 12 pages.
International Search Report and Written Opinion for PCT/US2011/049122 dated Jun. 6, 2012, 12 pages.
Non-final Office Action for U.S. Appl. No. 13/365,843 dated Jun. 26, 2013, 10 pages.
Notice of Allowance for U.S. Appl. No. 13/365,843 dated Jul. 31, 2013, 8 pages.
Non-final Office Action for U.S. Appl. No. 13/485,038 dated Dec. 20, 2013, 13 pages.
Chow et al, "Radio-over-Fiber Distributed Antenna System for WiMAX Bullet Train Field Trial," IEEE Mobile WiMAX Symposium, Jul. 9-10, 2009, Napa Valley, California, 4 pages.
Translation of First Office Action for Chinese Patent Application No. 201180019718X, dated Jul. 16, 2014, 15 pages.
Final Office Action for U.S. Appl. No. 13/628,497 dated Aug. 7, 2014, 16 pages.
Advisory Action for U.S. Appl. No. 13/628,497 dated Sep. 17, 2014, 3 pages.
Advisory Action for U.S. Appl. No. 13/628,497 dated Oct. 6, 2014, 3 pages.
Non-final Office Action for U.S. Appl. No. 14/034,948 dated Sep. 2, 2014, 11 pages.
Translation of the Second Office Action for Chinese Patent Application No. 201180019718.X, dated Jan. 13, 2015, 10 pages.
International Search Report and Written Opinion for PCT/US2010/044884 dated Oct. 6, 2010, 14 pages.
International Search Report for PCT/US2013/043107 dated Sep. 9, 2013, 4 pages.
Final Office Action for U.S. Appl. No. 14/034,948 dated Dec. 1, 2014, 12 pages.
Advisory Action for U.S. Appl. No. 14/034,948 dated Jan. 27, 2015, 2 pages.
Translation of the Third Office Action for Chinese Patent Application No. 201180019718.X dated Apr. 30, 2015, 10 pages.
Non-final Office Action for U.S. Appl. No. 12/509,099 dated Jan. 12, 2012, 8 pages.
Final Office Action for U.S. Appl. No. 12/509,099 dated Apr. 11, 2012, 11 pages.
Advisory Action for U.S. Appl. No. 12/509,099 dated Jun. 18, 2012, 3 pages.
Examiner's Answer to the Appeal Brief for U.S. Appl. No. 12/509,099 dated Nov. 8, 2012, 15 pages.

(56) References Cited

OTHER PUBLICATIONS

Non-final Office Action for U.S. Appl. No. 13/724,451 dated Jan. 15, 2015, 8 pages.
Non-final Office Action for U.S. Appl. No. 14/034,948 dated Apr. 1, 2015, 12 pages.
Decision on Appeal for U.S. Appl. No. 12/509,099 dated Jul. 15, 2015, 6 pages.
Final Office Action for U.S. Appl. No. 13/724,451 dated May 27, 2015, 10 pages.
Non-final Office Action for U.S. Appl. No. 14/138,580 dated May 13, 2015, 20 pages.
Ho, K. C. et al., "Solution and Performance Analysis of Geolocation by TDOA," IEEE Transactions on Aerospace and Electronic Systems, vol. 29, No. 4, Oct. 1993, pp. 1311-1322.
Translation of the Fourth Office Action for Chinese Patent Application No. 201180019718.X, dated Nov. 4, 2015, 10 pages.
International Search Report for International Patent Application No. PCT/US2014/033452, dated Jul. 22, 2014, 4 pages.
International Preliminary Report on Patentability for International Patent Application No. PCT/US2014/033452, dated October 27, 2015, 10 pages.
Notice of Acceptance for Australian Patent Application No. 2011232897, dated Oct. 26, 2015, 3 pages.
Patent Examination Report No. 1 for Australian Patent Application No. 2011232897 dated Jun. 26, 2015, 2 pages.
Final Office Action for U.S. Appl. No. 14/138,580, dated Oct. 5, 2015, 21 pages.
Non-Final Office Action for U.S. Appl. No. 13/900,859, dated Sep. 23, 2015, 16 pages.
Schwarz, Volker, et al., "Accuracy of a Commercial UWB 3D Location/Tracking System and its Impact on LT Application Scenarios," International Conference on Ultra-Wideband, Sep. 5-8, 2005, IEEE, 5 pages.
Shibuya, Akinori et al., "A High-Accuracy Pedestrian Positioning Information System Using Pico Cell Techniques," Vehicular Technology Conference Proceedings, May 15-18, 2000, Tokyo, Japan, IEEE, pp. 496-500.
English Translation of the Second Office Action for Chinese Patent Application No. 201080039136.3, dated Nov. 18, 2014, 11 pages.
Patent Examination Report No. 1 for Australian Patent Application No. 2010276451, dated Jul. 17, 2014, 3 pages.
International Search Report and Written Opinion for PCT/US2010/042420, dated Nov. 4, 2010, 17 pages.
Gezici, Sinan, et al., "Localization via Ultra-Wideband Radios: A look at positioning aspects of future sensor networks," IEEE Signal Processing Magazine, vol. 22, No. 4, Jul. 2005, pp. 70-84.
Ingram, S.J., et al., "Ultra WideBand Indoor Positioning Systems and their Use in Emergencies," Position Location and Navigation Symposium, Apr. 2004, pp. 706-715.
Federal Communications Commision (FCC), "Revision of Part 15 of the Commission's Rules Regarding Ultra-Wideband Transmission Systems," First Report and Order, ET Docket 98-153, FCC 02-48; Released Apr. 22, 2002, 118 pages.
Luo, B., et al., "Centralized UWB/WLAN Distribution Network using Low Cost Radio Over Multimode Fiber Technology," IEEE Vehicular Technology Conference, Sep. 2005, pp. 799-801.
Sauer, Michael, et al., "Experimental investigation of multimode fiber bandwidth requirements for 5.2 GHz WLAN signal transmission," Optical Fiber Communication Conference, Mar. 2006, Anaheim, California, 3 pages.
Sauer, Michael, et al., "Experimental Study of Radio Frequency Transmission over Standard and High-Bandwidth Multimode Optical Fibers," International Topical Meeting on Microwave Photonics, Oct. 2005, pp. 99-102.
Wah, Michael, et al., "Wireless Ultra Wideband Communications Using Radio Over Fiber," IEEE Conference on Ultra Wideband Systems and Technologies, Nov. 2003, pp. 265-269.
Non-final Office Action for U.S. Appl. No. 12/509,099, dated Mar. 11, 2016, 9 pages.
Notice of Allowance for U.S. Appl. No. 14/859,542, dated Apr. 6, 2016, 7 pages.
Final Office Action for U.S. Appl. No. 13/900,859 dated Feb. 19, 2016, 19 pages.
Non-Final Office Action for U.S. Appl. No. 14/533,383, dated Dec. 6, 2016, 18 pages.
Non-Final Office Action for U.S. Appl. No. 14/616,088, dated Dec. 8, 2016, 13 pages.
Ex Parte Quayle Action for U.S. Appl. No. 15/281,907, dated Dec. 2, 2016, 6 pages.

* cited by examiner

LOCATION BASED SERVICES IN A DISTRIBUTED COMMUNICATION SYSTEM, AND RELATED COMPONENTS AND METHODS

PRIORITY APPLICATION

This application claims the benefit of priority under 35 U.S.C. §119 of U.S. Provisional Application No. 61/637,458, filed on Apr. 24, 2012, the content of which is relied upon and incorporated herein by reference in its entirety.

BACKGROUND

Field of the Disclosure

The technology of the disclosure relates to ways to facilitate the provision of location based information to wireless client devices in a distributed communication system.

Technical Background

Wireless communication is rapidly growing, with increasing demands for high-speed mobile data communication. So-called "wireless fidelity" or "WiFi" systems and wireless local area networks (WLANs) are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" to communicate with an access point device. Distributed antenna systems are particularly useful when deployed inside buildings or other indoor environments where client devices may not otherwise be able to receive radio frequency (RF) signals from a source.

One approach to deploying a distributed communications system involves the use of RF antenna coverage areas, or "antenna coverage areas." Antenna coverage areas can have a relatively short range from a few meters up to twenty meters. Combining a number of access point devices creates an array of antenna coverage areas. Because the antenna coverage areas each cover small areas, there are typically only a few users per antenna coverage area. This minimizes the amount of bandwidth shared among users.

One type of distributed communications system for creating antenna coverage areas, called "Radio-over-Fiber" or "RoF," utilizes RF signals sent over optical fibers. Such systems can include a head-end station optically coupled to multiple remote antenna units that each provide antenna coverage areas. The remote antenna units each include RF transceivers coupled to an antenna to transmit RF signals wirelessly, wherein the remote antenna units are coupled to the head-end station via optical fiber links. The RF transceivers in the remote antenna units are transparent to the RF signals, and convert incoming optical RF signals from the optical fiber link to electrical RF signals via optical-to-electrical (O/E) converters, which are then passed to the RF transceiver. The transceiver converts the electrical RF signals to electromagnetic signals via antennas coupled to the RF transceiver provided in the remote antenna units. The antennas also receive electromagnetic signals from clients in the antenna coverage area and convert them to electrical RF signals (i.e., electrical RF signals in wire). The remote antenna units then convert the electrical RF signals via electrical-to-optical (E/O) converters. The optical RF signals are then sent to the head-end station via the optical fiber link.

It may be desired to provide such optical fiber-based distributed communications systems indoors, such as inside a building or other facility, to provide indoor wireless communication for clients. Other services may be negatively affected or not possible due to the indoor environment. For example, it may be desired or required to provide localization services for a client, such as emergency 911 (E911) services as an example. If the client is located indoors, techniques such as global positioning services (GPS) may not be effective at providing or determining the location of the client. Further, triangulation and/or trilateration techniques from the outside network may not be able to determine the location of the client.

SUMMARY OF THE DETAILED DESCRIPTION

Embodiments disclosed herein include location services for distributed communication systems. Related components, systems, and methods are also disclosed herein. For example, the systems disclosed herein can provide location information to mobile terminals that may not otherwise be able to receive global positioning system (GPS) information from the GPS satellites, such as when the mobile terminal does not receive GPS signals from the GPS satellites. Providing location information to clients inside a building or other location may make location based services, such as emergency (E911) services, possible based on the location information. The distributed communications system may be provided location information about its components through a number of techniques. The distributed communications system may then pass that information to clients.

In this regard, in one embodiment, a distributed communications apparatus comprises at least one downlink input configured to receive downlink communications signals and at least one interface configured to receive and provide the downlink communications signals to a remote unit using a first protocol. The remote unit is configured to provide location indicia using a second protocol to a client device within an antenna coverage area associated with the remote unit, wherein the second protocol is selected from the group consisting of radio-frequency identification (RFID), BLUETOOTH, Zigbee, and Dash7. Note that the RFID technology may incorporate near field communication (NFC) technology.

In another embodiment, a method for providing location information to a client comprises at at least one downlink input, receiving downlink communications signals; at at least one interface, receiving and providing the downlink communications signals to a remote unit using a first protocol; and at the remote unit, providing location indicia using a second protocol to a client device within an antenna coverage area associated with the remote unit, wherein the second protocol is selected from the group consisting of RFID, BLUETOOTH, Zigbee, and Dash7.

In another embodiment, a distributed communications apparatus comprises at least one downlink input configured to receive downlink communications signals and at least one interface configured to receive and provide the downlink communications signals to a remote unit. The remote unit is configured to communicate with one or more client devices and provide location information indicating a current location of the client device. The apparatus further comprises a control system configured to receive data relating to location information relating to a location of the remote unit, wherein the location data is derived from the group consisting of: a building plan, an RF survey, and a walk through interaction.

In another embodiment, a method for providing location information comprises providing a central unit and one or more remote units in the distributed communications apparatus; providing a control system in the distributed communications apparatus; and receiving data relating to location information relating to a location of the one or more remote units, wherein the location data is derived from the group consisting of: a building plan, an RF survey, and a walk through interaction.

In another embodiment, a computer-readable medium comprising software with instructions is provided. The instructions allow the computing device to: receive location information relating to a distributed communications apparatus, wherein the location information is derived is derived from the group consisting of: a building plan, an RF survey, and a walk through interaction; assign locations to components within the distributed communications apparatus based on the location information; and provide the location information to a client device through a remote unit within the distributed communications apparatus.

In another embodiment, a distributed communications apparatus comprises at least one downlink input configured to receive downlink communications signals and at least one interface configured to receive and provide the downlink communications signals to a remote unit. The remote unit is configured to communicate with one or more client devices and receive from the client devices location information indicating a current location of the client device; and a control system is configured to use the location information from the client devices and calculate a location of the remote unit.

In another embodiment, a method for providing location information to a distributed communications apparatus comprises providing a central unit and one or more remote units in the distributed communications apparatus; providing a control system in the distributed communications apparatus; receiving location data from one or more client devices; and calculating a location for one or more components of the distributed communications apparatus based at least in part on the location data from the one or more client devices.

In another embodiment, a client device for assisting in calculating location information for a distributed communications apparatus is provided. The client device comprises a user interface through which the user may interact with a control system of the client device to perform computing operations; a location determination service configured to provide location information to the control system; and the control system operatively coupled to the user interface. The control system is configured to communicate with the distributed communications apparatus and provide the location information from the client device to the distributed communications apparatus.

In another embodiment, a computer-readable medium comprising software with instructions is provided. The instructions allow a computing device to receive location data from one or more client devices; calculate a location for one or more components of the distributed communications apparatus based at least in part on the location data from the one or more client devices; and store the location information in a database associated with the distributed communications apparatus.

Additional features and advantages will be set forth in the detailed description which follows, and in part will be apparent from that description or recognized by practicing the embodiments as described herein.

The foregoing description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include location services for distributed communication systems. Related components, systems, and methods are also disclosed herein. For example, the systems disclosed herein can provide location information to mobile terminals that may not be able to receive otherwise global positioning system (GPS) information from the GPS satellites, such as, for example, when the mobile terminal does not receive GPS signals from the GPS satellites. Providing location information to clients inside a building or other location may make location based services, such as emergency (E911) services, for example, possible based on the location information. The distributed communications system may be provided location information about its components through a number of techniques. Once the distributed communications system has the location information, such location information may be passed to clients.

Figure 1:
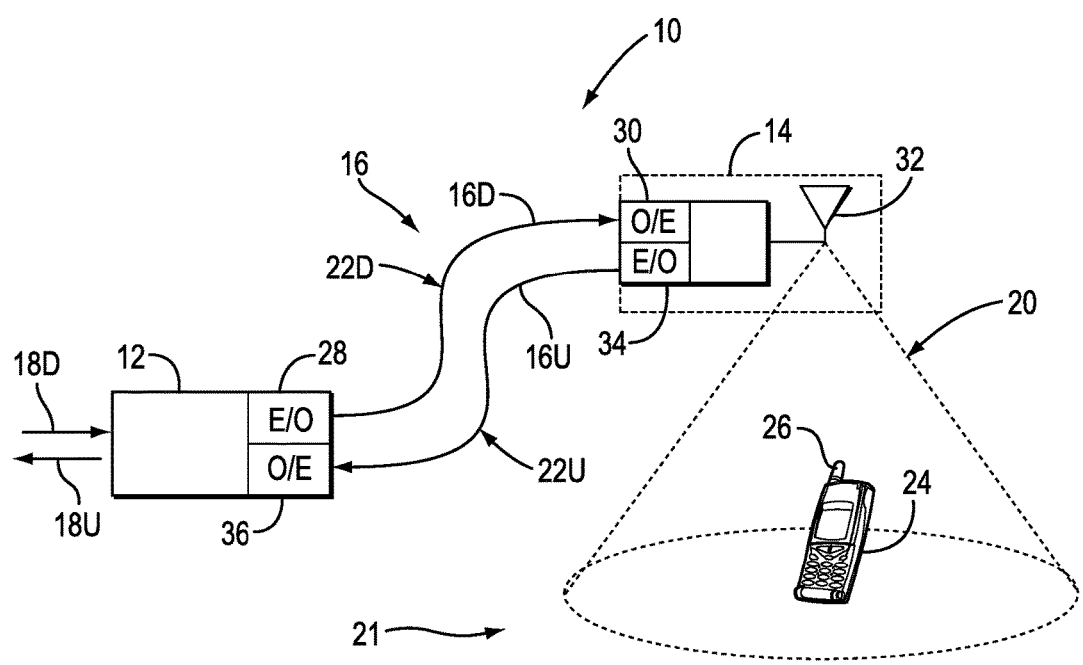
FIG. 1 is a schematic diagram of an exemplary optical fiber-based distributed communications system.
Figure 2:
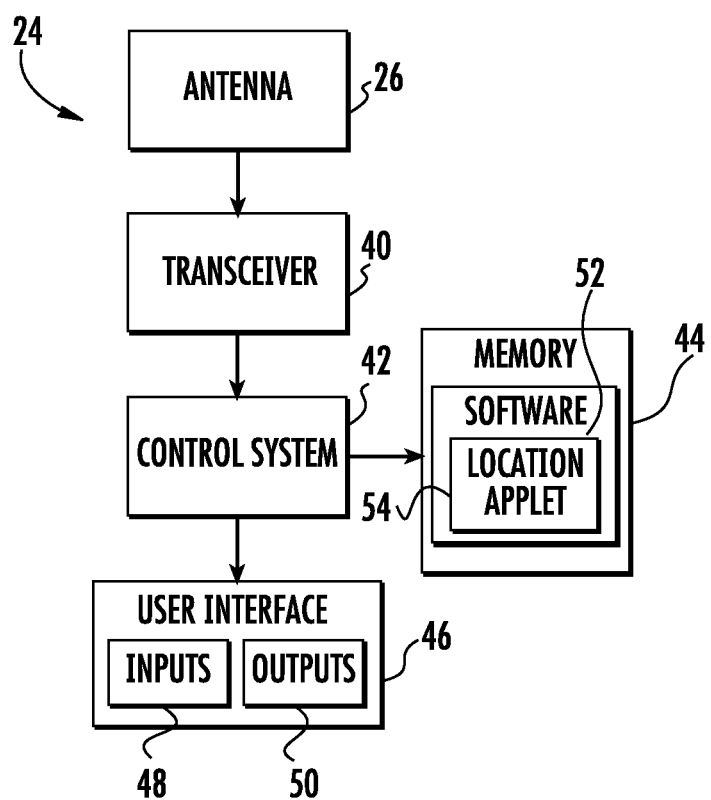
FIG. 2 is a block diagram of an exemplary wireless client device that may be used in a distributed communications system.
Figure 3:
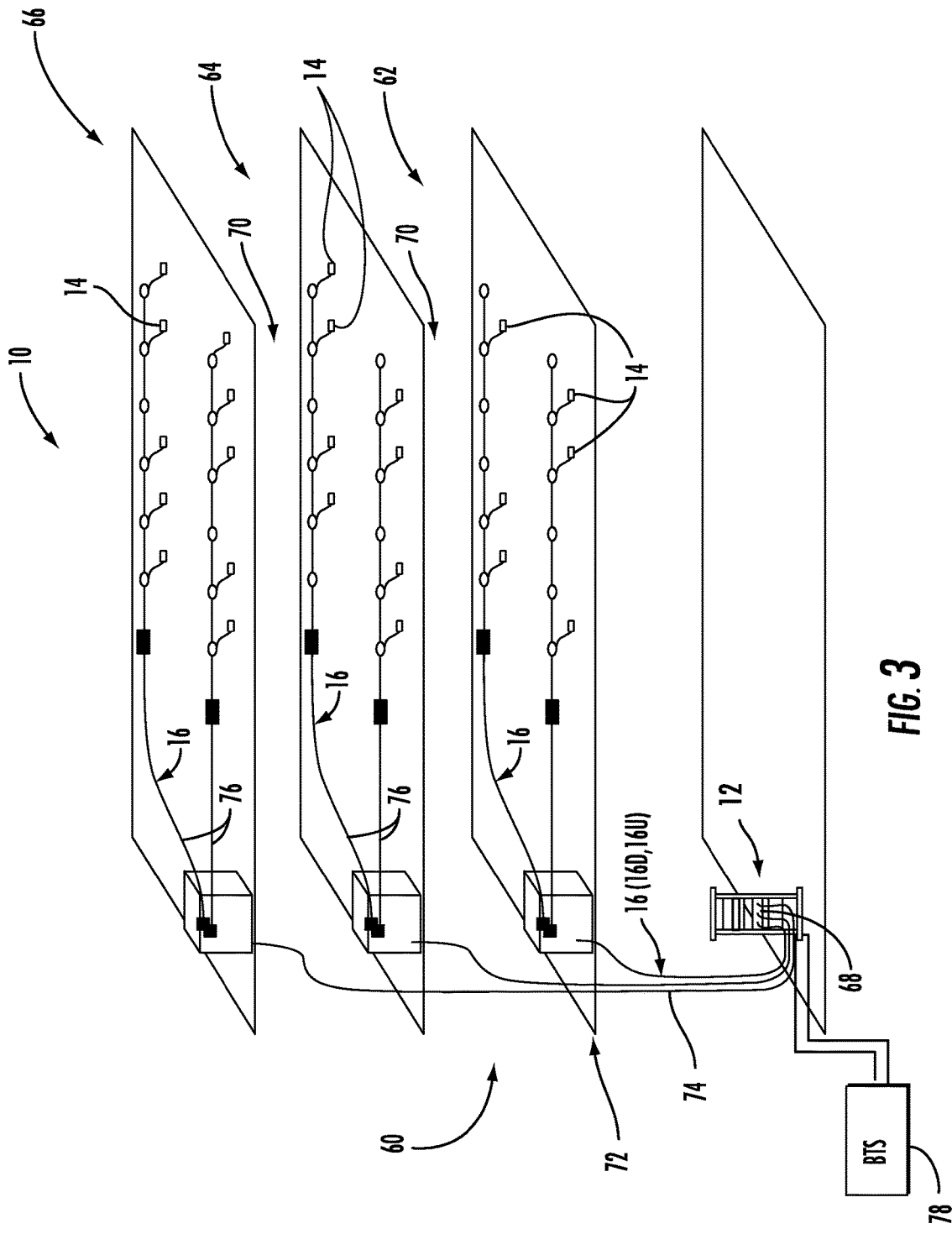
FIG. 3 is a partially schematic cut-away diagram of an exemplary building infrastructure in which an optical fiber-based distributed communications system is employed.
Figure 4:
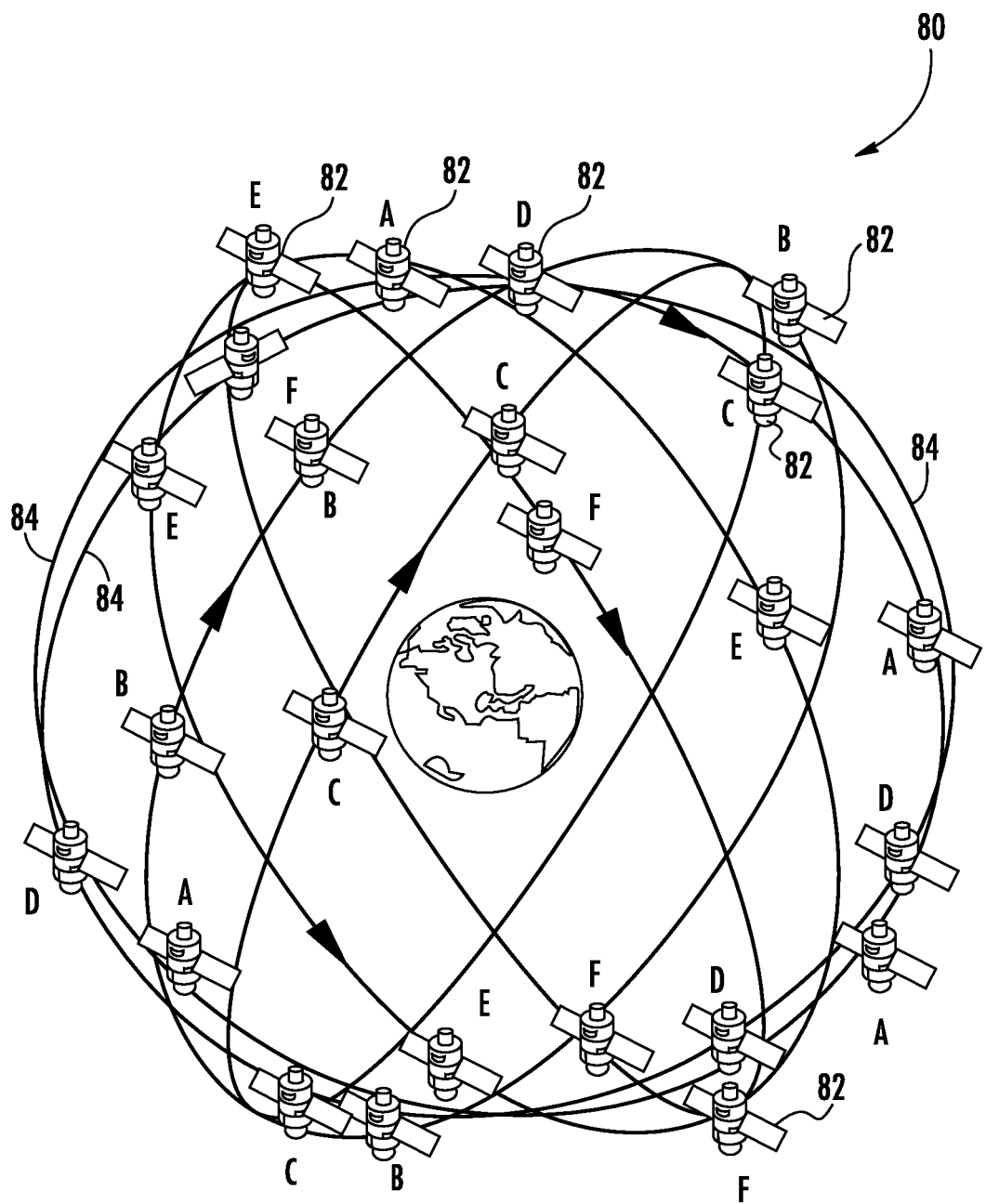
FIG. 4 is a stylized depiction of a global positioning satellite system useful for exemplary embodiments of the present disclosure.
Figure 5:
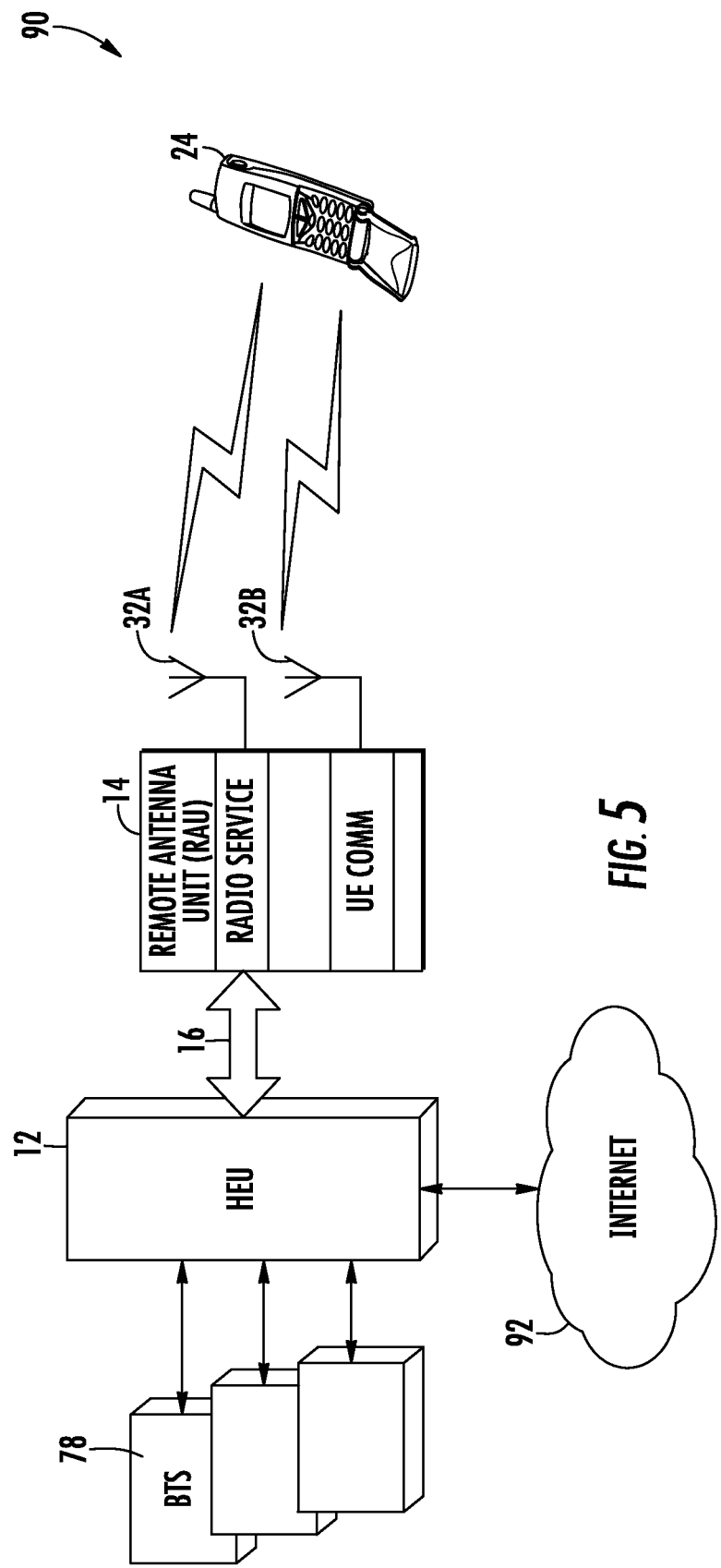
FIG. 5 is a block diagram of an exemplary embodiment of a distributed communications apparatus with a secondary protocol module used to communicate with a client device.

Before discussing the exemplary components, systems, and methods of providing localization services in a distributed communications system, which starts at FIG. 5, an exemplary generalized optical fiber-based distributed communications is first described with regard to FIGS. 1-3 and a GPS is described with regard to FIG. 4.

In this regard, FIG. 1 is a schematic diagram of a generalized embodiment of an optical fiber-based distributed communications system, sometimes referred to herein as a distributed communications apparatus. In this exemplary embodiment, the system is an optical fiber-based distributed communications system 10 that is configured to create one or more antenna coverage areas for establishing communications with wireless client devices (sometimes referred to herein as mobile terminals) located in the radio frequency (RF) range of the antenna coverage areas. In this regard, the distributed communications system 10 includes a central unit, an example of which is head-end equipment, exemplified as a head-end unit or HEU 12, one or more remote units, exemplified as remote antenna units (RAUs) 14 and an optical fiber link 16 that optically couples the HEU 12 to the RAU 14. The HEU 12 is configured to receive communications over downlink electrical RF signals 18D from a source or sources, such as a network or carrier as examples, and provide such communications to the RAU 14. Such downlink communications signals are received through a conventional input, sometimes referred to herein as a downlink input. If multiple sources are present, there may be multiple downlink inputs. The HEU 12 is also configured to return communications received from the RAU 14, via uplink electrical RF signals 18U, back to the source or sources. In this exemplary embodiment, the optical fiber link 16 includes at least one downlink optical fiber 16D to carry signals communicated from the HEU 12 to the RAU 14 and at least one uplink optical fiber 16U to carry signals communicated from the RAU 14 back to the HEU 12. At least one interface is used to couple the HEU 12 to the optical fiber link 16. The interface may be a conventional interface as is well understood and is configured to receive downlink communications signals and pass the downlink communications signals to the RAU 14 through the optical fiber link 16. Additional interfaces may also exist for the uplink communications signals, or a single interface may handle both uplink and downlink signals. Note that there are embodiments where both the uplink and downlink signals 18U, 18D are transmitted on the same optical fiber link 16, albeit at different frequencies. The present disclosure is operable in both situations.

With continuing reference to FIG. 1, the optical fiber-based wireless system 10 has an antenna coverage area 20 that can be substantially centered about the RAU 14. The antenna coverage area 20 of the RAU 14 forms an RF coverage area 21. The HEU 12 is adapted to perform or to facilitate any one of a number of Radio-over Fiber (RoF) applications, such as RFID, wireless local-area network (WLAN) communication, or cellular phone service. Shown within the antenna coverage area 20 is a client device 24 in the form of a mobile terminal as an example, which may be a cellular telephone, smart phone, tablet computer, or the like as an example. The client device 24 can be any device that is capable of receiving RF communication signals. The client device 24 includes an antenna 26 (e.g., a bipole, monopole, bowtie, inverted F, a wireless card, or the like) adapted to receive and/or send electromagnetic RF signals.

To communicate the electrical RF signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical signals to be communicated wirelessly through an antenna 32 of the RAU 14 to client devices 24 located in the antenna coverage area 20.

The antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEU 12 converts the uplink optical RF signals 22U into uplink electrical RF signals, which can then be communicated as uplink electrical RF signals 18U back to a network or other source. The client device 24 could be in range of any antenna coverage area 20 formed by a RAU 14.

With reference to FIG. 2, a block diagram of a client device 24 is provided. The client device 24 may be a wireless client such as a mobile terminal and includes the antenna 26 and a wireless transceiver 40, a control system 42, computer-readable memory 44, and a user interface 46. The user interface 46 includes inputs 48 and outputs 50 such as a keypad, touch screen, or the like. The computer-readable memory 44 includes software 52 including a location applet 54 which may perform some of the operations of the present disclosure. In an alternate embodiment, the location applet 54 may be stored elsewhere in the client device 24. For example, the location applet 54 may be in the transceiver 40, or within an element such as a digital signal processor (not shown) within the transceiver 40.

With continuing reference to FIG. 2, in an exemplary embodiment, the location applet 54 operates to determine the location of the client device 24 based on information received. In the simplest embodiment, the location applet 54 communicates with a GPS receiver within the client device 24 and uses the calculated position output by the GPS receiver. In another embodiment, such as when the client device 24 is inside and unable to receive GPS signals, the client device 24 communicates with the distributed communications system 10 (FIG. 1) and receives location information from one or more components within the distributed communications system 10. If the client device 24 communicates with only a single RAU 14, then client device 24 may treat the location coordinates provided by the RAU 14 as the current location of the client device 24. Such an approach provides a fairly coarse resolution to the location of the client device (i.e., somewhere within the coverage area 21 of the particular RAU 14). If the client device 24 is mobile (e.g., a smart phone), the client device may acquire and store additional data such as time of first/last contact with an RAU 14, bearing, speed, signal strength, antenna reach, time, accelerometer information, last GPS reading, and the like. A compromise may be made in view of available memory space in memory 44 to restrict how many data points are maintained and used in the calculation determination. The restriction may be time based (e.g., the last two hours) or a number of RAUs 14 (e.g., the last twenty RAUs 14). Other thresholds may be set besides those provided as exemplary embodiments. If multiple RAUs 14 are concurrently in communication with the client device 24, the location applet 54 may use trilateration or other technique to calculate the location of the client device 24. Once the location is calculated, this location may be used by other features of the client device such as E911 services or other location based services. The preceding discussion of location calculation by the location applet 54 presumes that the client device 24 receives location information from the distributed communications system 10. Some embodiments of the present disclosure provide further details on how such location information may be provided to the client device 24.

To provide further exemplary illustration of how an optical fiber-based distributed communications system can be deployed indoors, FIG. 3 is a partially schematic cutaway diagram of a building infrastructure 60 employing the distributed communications system 10 of FIG. 1. The building infrastructure 60 generally represents any type of building in which the distributed communications system 10 can be deployed. As previously discussed with regard to FIG. 1, the distributed communications system 10 incorporates the HEU 12 to provide various types of communication services to coverage areas within the building infrastructure 60, as an example. For example, as discussed in more detail below, the distributed communications system 10 in this embodiment is configured to receive wireless RF signals and convert the RF signals into RoF signals to be communicated over the optical fiber link 16 to the RAUs 14. The system 10 in this embodiment can be, for example, an indoor distributed antenna system ("indoor DAS" or "IDAS") to provide wireless service inside the building infrastructure 60. The wireless signals can include cellular service, wireless services such as RFID tracking, Wireless Fidelity (WiFi), local area network (LAN), and combinations thereof.

The building infrastructure 60 includes a first (ground) floor 62, a second floor 64, and a third floor 66. The floors 62, 64, 66 are serviced by the HEU 12 through a main distribution frame 68, to provide antenna coverage areas 70 in the building infrastructure 60. Only the ceilings of the floors 62, 64, 66 are shown in FIG. 3 for simplicity of illustration. In the example embodiment, a main cable 72 has a number of different sections that facilitate the placement of a large number of RAUs 14 in the building infrastructure 60. Each RAU 14 in turn services its own coverage area in the antenna coverage areas 70. The main cable 72 can include, for example, a riser section 74 that carries all of the downlink and uplink optical fibers 16D, 16U to and from the HEU 12. The main cable 72 can include one or more multi-cable (MC) connectors adapted to connect select downlink and uplink optical fibers 16D, 16U, along with an electrical power line, to a number of optical fiber cables 76.

The main cable 72 enables multiple optical fiber cables 76 to be distributed throughout the building infrastructure 60 (e.g., fixed to the ceilings or other support surfaces of each floor 62, 64, 66) to provide the antenna coverage areas 70 for the first, second, and third floors 62, 64, and 66. In an example embodiment, the HEU 12 is located within the building infrastructure 60 (e.g., in a closet or control room), while in another embodiment the HEU 12 may be located outside of the building infrastructure 60 at a remote location. A base transceiver station (BTS) 78, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs is deployed at a plurality of remote locations to provide wireless telephone coverage. Each BTS serves a corresponding cell and when a mobile terminal enters the cell, the BTS communicates with the mobile terminal. Each BTS can include at least one radio transceiver for enabling communication with one or more subscriber units operating within the associated cell.

FIGS. 1 and 3 are directed to optical fiber implementations, but the present disclosure is not so limited. Rather, any distributed antenna system, wire-based or a hybrid of wire and optical fiber cables, or the like, may be used with exemplary embodiments. Likewise, while FIGS. 1-3 focus on the provision of cellular services and/or the provision of WLAN services "riding" on the fiber network, the present disclosure also is operable with a network that is designed as a WLAN and has a wire-based solution (e.g., twisted pair, CAT5, CAT6, coaxial, pure optical, hybrid (optical and coax), or the like). This disclosure is likewise operable with composite cabling structures (e.g., DC power wires and fiber strands in a single cable).

FIG. 4 illustrates a stylized depiction of a constellation of global positioning satellites 80, which may sometimes be referred to as a global navigation satellite system (GNSS). The constellation of satellites 80 is formed from a plurality of satellites 82 (also denoted A-F in FIG. 4) that orbit the earth in predefined and well understood orbits 84. The satellites 82 transmit a signal which may be received by terrestrial devices, such as client device 24. Normally, the terrestrial device needs signals from three satellites 82 from which the terrestrial device may triangulate its location. However, the signals from the satellites 82 are typically fairly weak and at frequencies which do not readily penetrate indoors or through other barriers.

In an exemplary embodiment, the present disclosure allows elements within a distributed communications system 10 to provide location information to the client device 24. Equipped with such location information, the client device 24 can provide that location information when securing E911 services or when other applications on the client device 24 need such location information.

For E911 and most other location based services, the client device 24 provides its location information to the provider of the location based services. As noted above, one of the issues associated with providing location information is ascertaining the location of the client device 24. This issue is exacerbated when the client device 24 is indoors because satellite signals suffer from absorption in building materials. If the client device 24 could receive location information from a distributed communications system, the client device 24 could use that information in conjunction with location based services. In many instances, the location based services do not need an extremely fine resolution (e.g., less than one meter) of the location of the client device 24. That is, a reasonably coarse location determination (e.g., within ten to twenty meters) may be sufficient for most location based services. If the RAU 14 (or other access point element associated with the system 10) knows its location and can send that location to the client device 24, then the client device 24 can treat the location of the RAU 14 (or other access point element) as the location of the client device 24. However, satellite signals are not reliable indoors, so it may be difficult for the RAU 14 to learn its location.

A first exemplary embodiment of the present disclosure provides a system and techniques through which the distributed communications system 10 may provide the location information to the client device 24. This embodiment is discussed with reference to FIGS. 5-7. A second exemplary embodiment of the present disclosure provides a first technique through which the distributed communications system 10 may learn location information for provision to the client device 24. This second embodiment is discussed with reference to FIG. 8. A third exemplary embodiment of the present disclosure provides a second technique through which the system 10 may learn location information for provision to the client device 24. This third exemplary embodiment is discussed with reference to FIGS. 9 and 10. A fourth exemplary embodiment of the present disclosure provides a third technique through which the system 10 may learn location information for provision to the client device 24. This fourth exemplary embodiment is discussed with reference to FIG. 11.

With reference to FIG. 5, a distributed communications system 90 that communicates with the client device 24 to provide a first type of service such as cellular communication capability using a first protocol (e.g., GSM, IS-95, UMTS, CDMA2000, WIMAX, LTE, or the like) and that provides location information to the client device 24 through a second protocol is provided. In an exemplary embodiment, the second protocol is one of RFID, BLUETOOTH, Zigbee, and Dash7. NFC standards cover communications protocols and data exchange formats, and are based on existing radio-frequency RFID standards including ISO/IEC 14443 and FeliCa. The standards include ISO/IEC 18092 and those defined by the NFC Forum.

The HEU 12 may be coupled to RAU 14 through an optical fiber 16. Likewise, the HEU 12 may be communicatively coupled to one or more BTS 78 and the internet 92. The RAU 14 may include a microprocessor and memory (not shown explicitly) in which location information such as geo-coordinates of the RAU 14 may be stored. The RAU 14 further includes a first antenna 32A which communicates with the client device 24 using the first protocol and a second antenna 32 which communicates with the client device 24 using the second protocol. In an alternate embodiment, a single antenna 32 is used for both protocols. As another alternate embodiment, the location information may be stored elsewhere, such as in the HEU 12 or even remotely such as in a database service such as Google Maps, or other central reference source or files such as iBwave site survey.

With continuing reference to FIG. 5, the RAU 14 knows its location and provides that location to the client device 24. The client device 24 may then treat the location of the RAU 14 as the location of the client device 24. Alternatively, if the client device 24 is in communication with a plurality of RAUs 14, then the client device 24 may use trilateration to ascertain the location of the client device 24 with greater precision. In another alternate embodiment, additional information at the client device 24 may be combined with the location information to ascertain a location for the client device 24. For example, time, accelerometer information, signal strength, last GPS reading, or the like may be used in combination with other data to determine a current location for the client device 24. The client device 24 may use the location information with third party applications, E911 services or other location based applications as appropriate.

Figure 6:
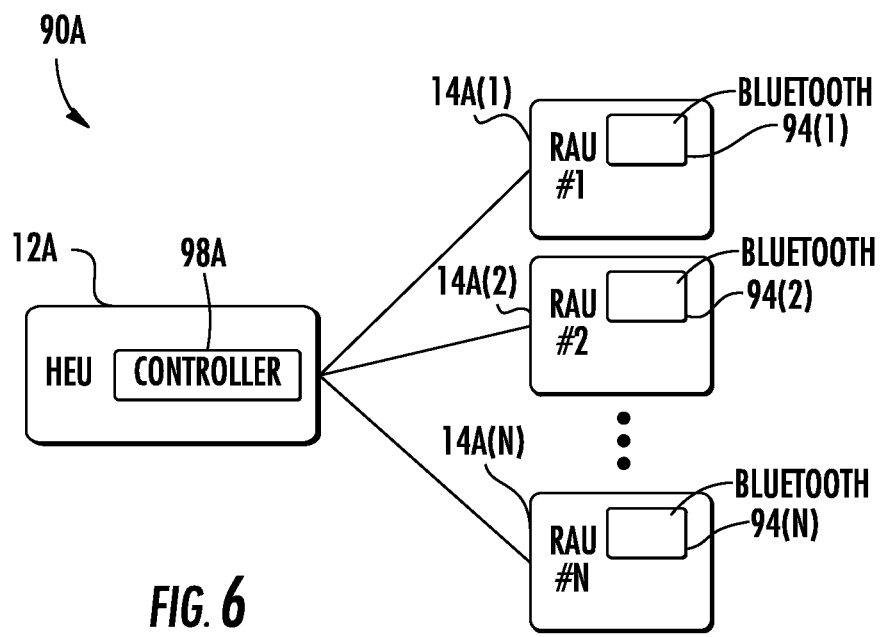
FIG. 6 is an exemplary embodiment of a distributed communications apparatus with a specific secondary protocol module.

FIG. 6 illustrates a first alternate embodiment of distributed communications system 90A. The distributed communications system 90A includes a HEU 12A and RAUs 14A(1)-14(N) with BLUETOOTH modules 94(1)-94(N), respectively, that allow communication with the client device 24 as previously described.

Figure 7:
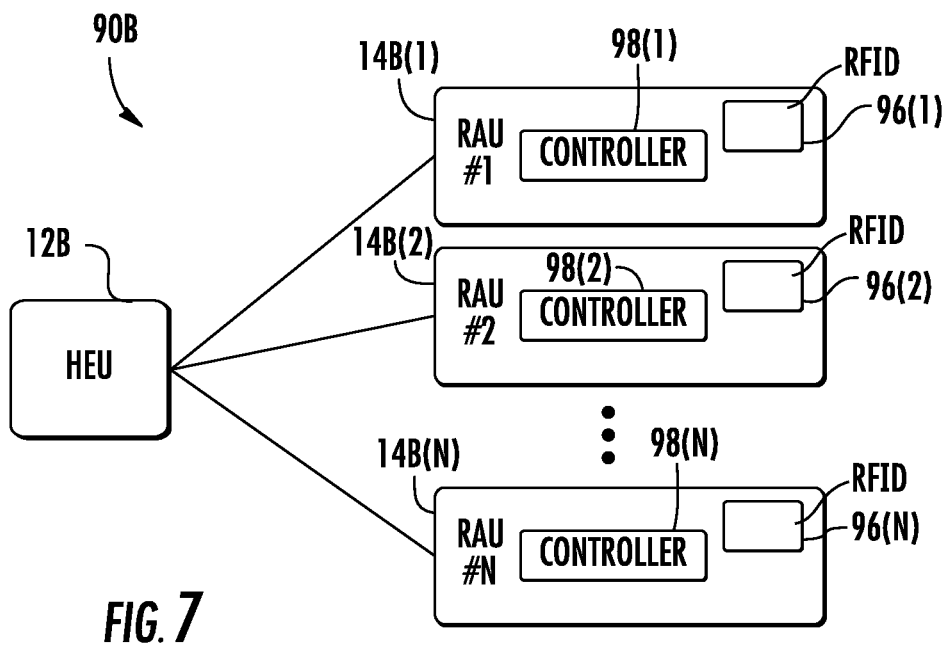
FIG. 7 is an exemplary embodiment of a distributed communications apparatus with a specific secondary protocol module.

Similarly, FIG. 7 illustrates a second alternate embodiment of distributed communications system 90B. The distributed communications system 90B includes a HEU 12B and RAUs 14B(1)-14B(N) with RFID modules 96(1)-96(N), respectively, that allow communication with client device 24 as previously described.

Note that the distributed communications systems 90A, 90B may include a location controller or other control system, which may be variously positioned in the distributed communications systems 90A, 90B. For example, in distributed communications system 90A, the location controller 98A may be positioned in or co-located with the HEU 12A. In contrast to the controller 98A, in distributed communications system 90B, the location controller can be distributed amongst the RAU 14B(1)-14B(N) as illustrated by location controllers 98(1)-98(N).

While FIGS. 5-7 focused on ways in which the distributed communications system 10 can provide location information to the client device 24, the present disclosure is not so limited. This disclosure also provides techniques by which the distributed communications system 10 can learn respective locations for the RAUs 14 within the system 10 such that this information can be passed to the client device 24. That is, there must be some way through which the distributed communications system 10 learns the locations of its component elements such that that information can be passed to the client device 24.

Figure 8:
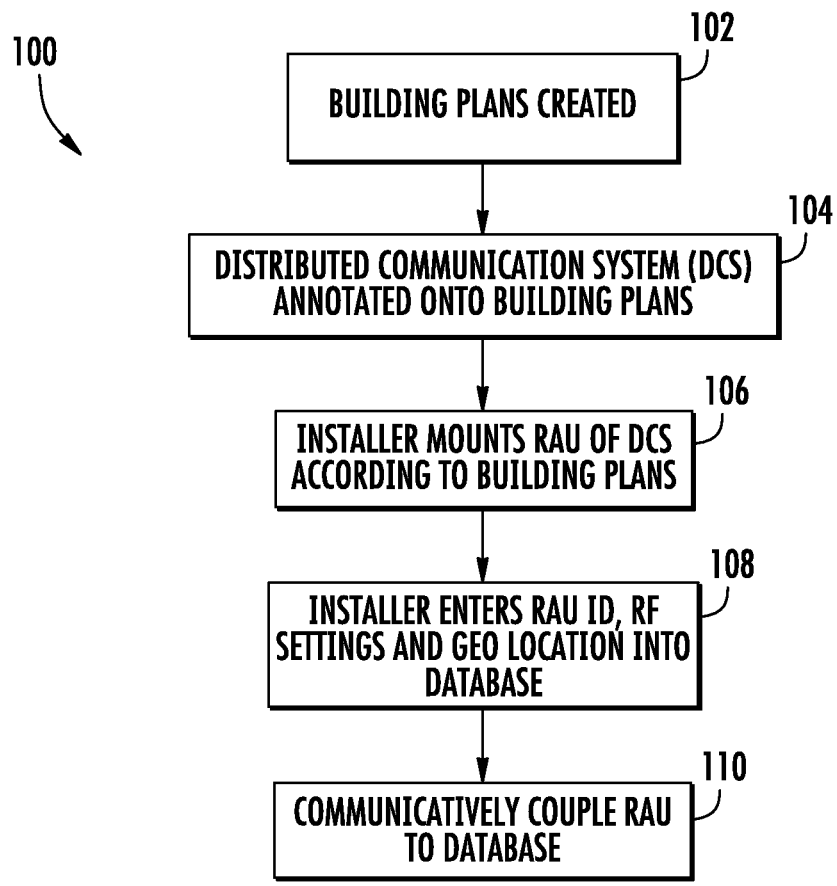
FIG. 8 is a flow chart of an exemplary embodiment through which the distributed communications apparatus learns location information.

In this regard, FIG. 8 illustrates a first technique through which the distributed communications system 10 may learn location information. In particular, a method 100 is illustrated through a flow chart wherein building plans are created (block 102). The building plans may be made before the building is constructed, or these may be retrofit plans. The building plans are annotated with indicia indicating where the distributed communications system 10 including the location of the RAUs 14 are located within the building (block 104). Given that the location of the building is known and that the building plans have the dimensions of the rooms, corridors, and other features of the building noted thereon, it is possible to calculate the position of the RAUs 14.

The installer then mounts the RAUs 14 of the distributed communications system 10 and the other components of the distributed communications system 10 according to the building plan (block 106). The installer may then enter the RAU identifier, any RF settings, and the geo-location into a database (block 108). This database may be in the controller 98A or 98(1)-98(N) or other location as desired. The RAUs 14 are then communicatively coupled to the database (block 110) and can retrieve location information therein as needed, requested, or desired for transmission to the client device 24. Such transmission may be on demand, continuously, or other arrangement and may use a secondary protocol as set forth above.

Figure 9:
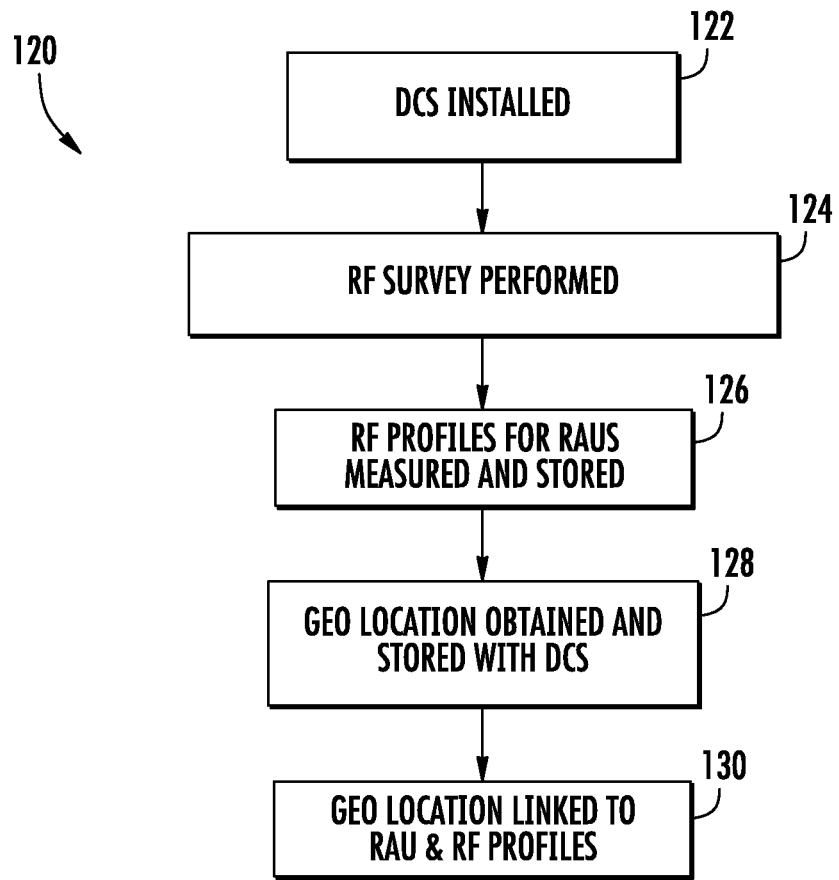
FIG. 9 is a flow chart of an exemplary embodiment through which the distributed communications apparatus learns location information.
Figure 10:
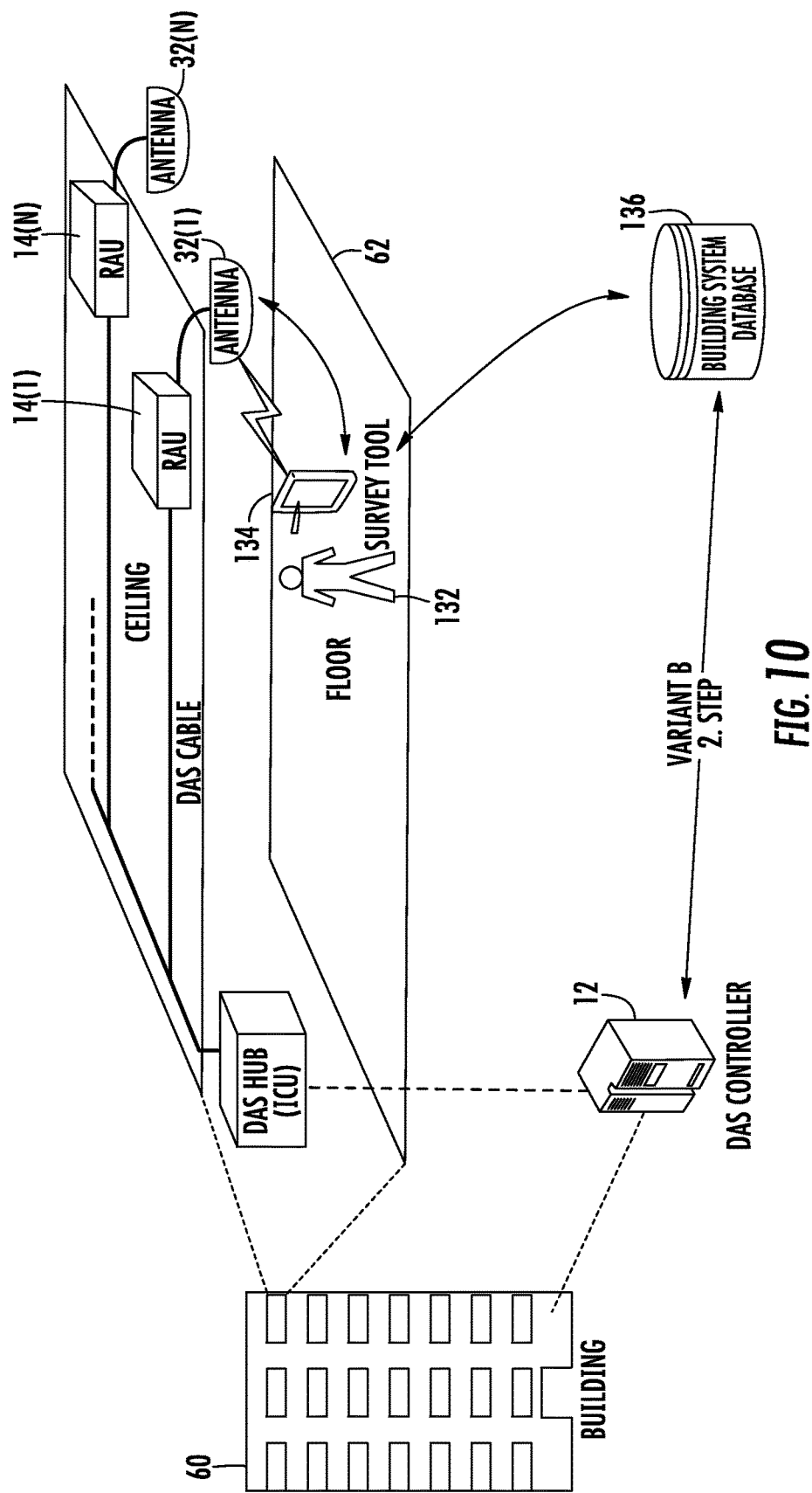
FIG. 10 is a schematic drawing of how a radio frequency survey may be performed to provide location information to the distributed communications apparatus.

A second technique to provide the distributed communications system 10 with location information is provided in FIGS. 9 and 10. In this second technique, an RF survey tool is used to assist in generating location information for use by the distributed communications system 10. A flowchart of this process 120 is provided in FIG. 9. In particular, the process 120 starts with the installation of the distributed communications system 10 (block 122). After installation, an RF survey is performed (block 124), by an individual 132 walking around the floor 62, 64, 66 of the building 60 with a survey tool 134 (floor 62 shown in FIG. 10).

The survey tool 134 measures RF signal strength and "fingerprint" of locations within the building 60. These RF profiles for the respective RAUs 14(1)-14(N) are measured and stored (block 126). In a first embodiment, the survey tool 134 communicates with the one of the RAUs 14(1)-14(N) and through the distributed communications system 10 to the database 136 in which the information relating to the RF profile is stored. In a second embodiment, the survey tool 134 communicates directly with the database 136. In either embodiment, the geolocations are obtained and stored with the distributed communications system 10 (block 128). The geolocations of a given RF profile may be ascertained by the survey tool 134 (e.g., using an accelerometer, compass, laser distance finder, or comparable elements to ascribe a location to a particular RF profile). The geolocations are linked to a particular RAU 14 and RF profile (block 130). The linkage may be done by the survey tool 134 using the appropriate software or within the database 136.

Figure 11:
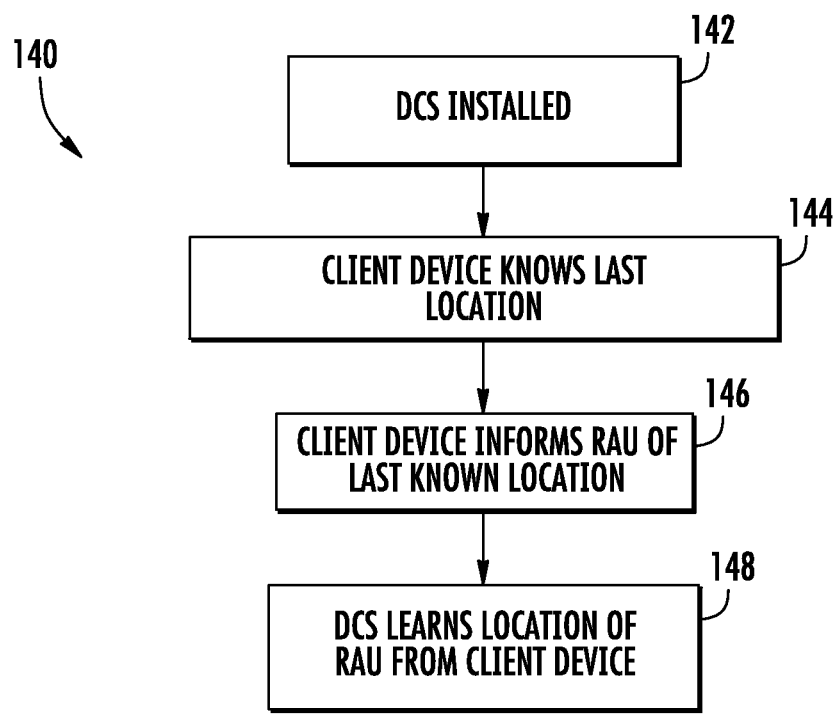
FIG. 11 is a flow chart of an exemplary embodiment through which the distributed communications apparatus learns location information.

A third technique 140 for learning geolocations of the RAUs 14(1)-14(N) of the distributed communications system 10 is provided in flowchart form with reference to FIG. 11. In this technique 140, the distributed communications system 10 is installed (block 142). A client device 24 equipped with a GPS or comparable service enters the building 60 with a "last known location" (block 144). When the client device 24 communicates with an RAU 14 of the distributed communications system 10, the client device 24 informs the distributed communications system 10 of the "last known location" (block 146). The last known location can be augmented by any additional information that the client device 24 possesses. For example, this additional information may include time elapsed since the last known location was updated. Older information may be weighted less heavily than information that is more contemporaneous. Information from an accelerometer, compass, and other navigation related tools may also be provided so that the distributed communications system 10 may infer a current location of the client device 24. Such last known location, additional information, and signal strength may then be used by the distributed communications system 10 to infer a location of an RAU 14 communicating with the client device 24. Over time, the distributed communications system 10 may collect sufficient data to have a reasonably high confidence of a given RAU 14 location (block 148). Once a threshold confidence is reached, the distributed communications system 10 may then provide such location information to other client devices 24 that have requested such location information.

Figure 12:
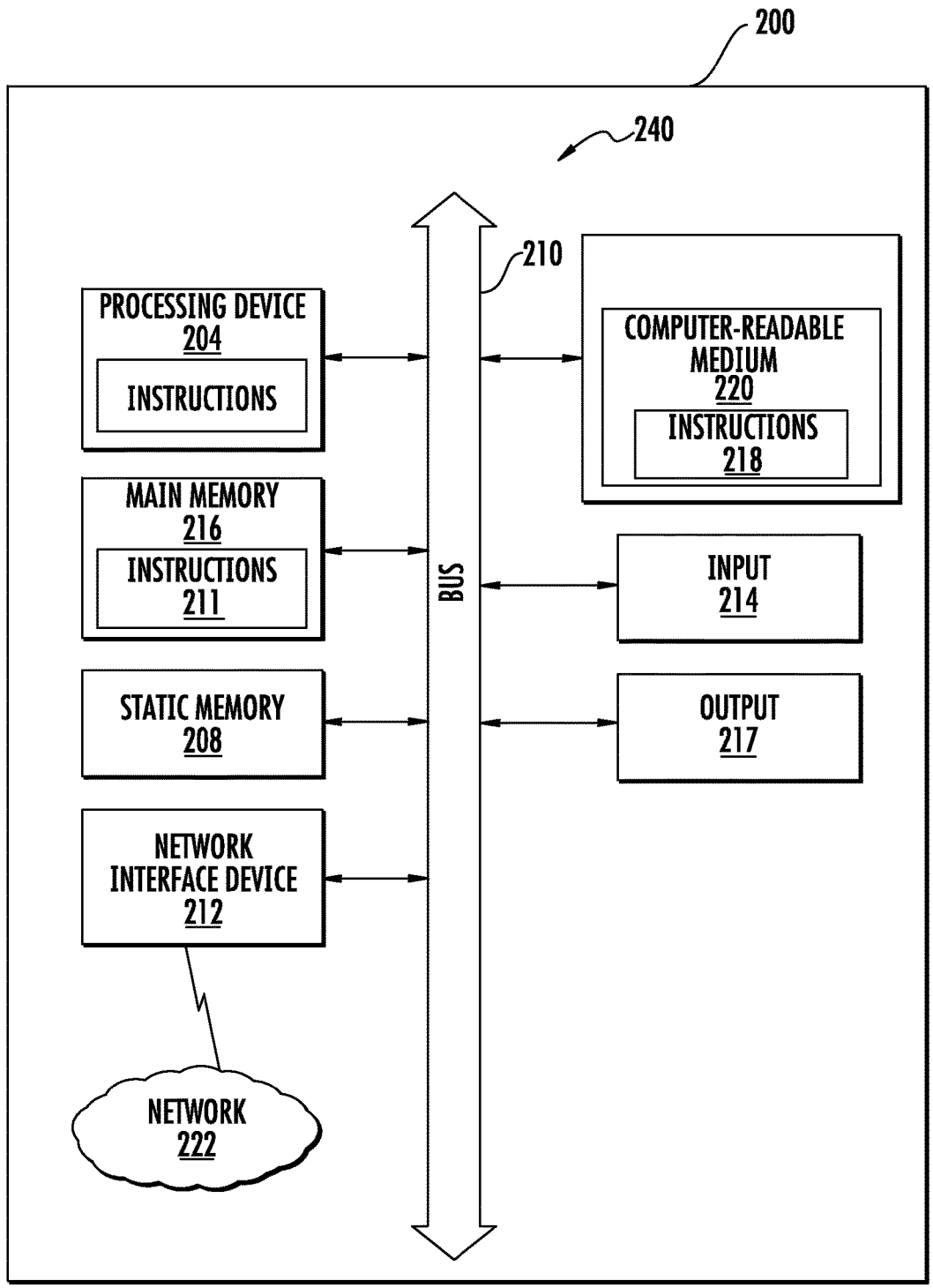
FIG. 12 is a schematic diagram of a generalized representation of an exemplary computer system that can be included in any of the modules provided in the distributed antenna systems and/or their components described herein.

The HEU 12, the RAU 14, the client device 24, and other elements disclosed herein can include a computer system 200. In this regard, FIG. 12 is a schematic diagram representation of additional detail regarding the HEU 12, RAU 14, client device 24 or other element in the exemplary form of an exemplary computer system 200 adapted to execute instructions from an exemplary computer-readable medium to perform power management functions. In this regard, the computer system 200 within which a set of instructions for causing the distributed communications system 10 to perform any one or more of the methodologies discussed herein may be executed. The computer system 200 may be connected (e.g., networked) to other machines in a LAN, an intranet, an extranet, or the Internet. The computer system 200 may operate in a client-server network environment, or as a peer machine in a peer-to-peer (or distributed) network environment. While only a single device is illustrated, the term "device" shall also include any collection of devices that individually or jointly execute a set (or multiple sets) of instructions to perform any one or more of the methodologies discussed herein. The computer system 200 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 200 in this embodiment includes a processing device or processor 204, a main memory 216 (e.g., read-only memory (ROM), flash memory, dynamic random access memory (DRAM) such as synchronous DRAM (SDRAM), etc.), and a static memory 208 (e.g., flash memory, static random access memory (SRAM), etc.), which may communicate with each other via the data bus 210. Alternatively, the processing device 204 may be connected to the main memory 216 and/or static memory 208 directly or via some other connectivity means. The processing device 204 may be a controller, and the main memory 216 or static memory 208 may be any type of memory.

The processing device 204 represents one or more general-purpose processing devices such as a microprocessor, central processing unit, or the like. More particularly, the processing device 204 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 204 is configured to execute processing logic in instructions for performing the operations discussed herein.

The computer system 200 may further include a network interface device 212. The computer system 200 also may or may not include an input 214 to receive input and selections to be communicated to the computer system 200 when executing instructions. The computer system 200 also may include an output 217, including but not limited to a visual display, an alphanumeric input device (e.g., a keyboard), and/or a cursor control device (e.g., a mouse).

The computer system 200 may or may not include a data storage device that includes instructions 218 stored in a computer-readable medium 220. The instructions 218 may also reside, completely or at least partially, within the main memory 216 and/or within the processing device 204 during execution thereof by the computer system 200, the main memory 216 and the processing device 204 also constituting computer-readable medium. The instructions 211 may further be transmitted or received over a network 222 via the network interface device 212.

While the computer-readable medium 220 is shown in an exemplary embodiment to be a single medium, the term "computer-readable medium" shall include a single medium or multiple media (e.g., a centralized or distributed database, and/or associated caches and servers) that store the instructions. The term "computer-readable medium" shall also include any medium that is capable of storing, encoding or carrying a set of instructions for execution by the processing device and that cause the processing device to perform any one or more of the methodologies of the embodiments disclosed herein. The term "computer-readable medium" shall thus include solid-state memories, optical and magnetic medium, and carrier wave signals.

The embodiments disclosed herein include various steps which may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. A variety of programming languages may be used to implement the teachings of the embodiments as described herein.

The various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the DAS systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor, which may reside in an ASIC. The ASIC may reside in a remote station. In the alternative, the processor and the storage medium may reside as discrete components in a remote station, base station, or server.

The operational steps described herein are described to provide examples and discussion, and may be performed in numerous different sequences other than the illustrated sequences. Operations described in a single operational step may actually be performed in a number of different steps, and one or more operational steps discussed in the exemplary embodiments may be combined. The operational steps illustrated in the flow chart diagrams may be subject to numerous different modifications as will be readily apparent to one of skill in the art. Information may be represented using any of a variety of different technologies and techniques. For example, data, instructions, commands, information, bits, symbols, and chips may be represented by voltages, currents, electromagnetic waves, magnetic fields or particles, optical fields or particles, or any combination thereof.

Further, as used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

The antenna arrangements disclosed herein may include any type of antenna desired, including dipole, monopole, and slot antennas. The distributed antenna systems that employ the antenna arrangements could include any type or number of communications mediums, including but not limited to electrical conductors, optical fiber, and air (i.e., wireless transmission). The DAS systems may distribute and the antenna arrangements disclosed herein may be configured to transmit and receive any type of communications signals, including but not limited to RF communications signals and digital data communications signals, examples of which are described in U.S. patent application Ser. No. 12/892,424, incorporated herein by reference in its entirety. Multiplexing, such as WDM and/or FDM, may be employed in any of the DASs described herein, such as according to the examples in U.S. patent application Ser. No. 12/892,424.

The description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

I claim:

1. A distributed communications apparatus, comprising:
at least one head end unit communicatively coupled to one or more base transceiver stations and an internet;
a plurality of remote antenna units (RAUs) coupled to the at least one head end unit through at least one optical fiber, each of the plurality of RAUs comprising:

a memory configured to store location information of the respective RAU;

a first antenna configured to communicate with a client device within an antenna coverage area of the RAU using a first protocol; and a second antenna configured to communicate with the client device using a second protocol;

at least one location controller associated with a database configured to store location indicia for one or more elements of the distributed communications apparatus;

at least one downlink input configured to receive downlink communications signals from the at least one head end unit;

at least one interface configured to receive and provide the downlink communications signals to one or more of the plurality of RAUs using the first protocol; and wherein at least one RAU of the plurality of RAUs is configured to:

retrieve location information of the at least one RAU from the at least one location controller;

provide the downlink communications signals through the first antenna using the first protocol to the client device; and provide the location information of the at least one RAU through the second antenna using the second protocol to the client device, wherein the second protocol is selected from group consisting of radio frequency identification (RFID), Zigbee, and Dash7.

2. The distributed communications apparatus of claim 1, wherein the distributed communications apparatus comprises a distributed antenna system and the at least one downlink input is associated with the at least one head end unit.

3. The distributed communications apparatus of claim 1, wherein the downlink communications signals comprise cellular communications signals.

4. The distributed communications apparatus of claim 1, wherein the downlink communications signals comprise radio frequency downlink communication signals.

5. The distributed communications apparatus of claim 1, wherein the at least one location controller is configured to capture the location indicia from one or more client devices.

6. The distributed communications apparatus of claim 1, wherein location indicia are initially provided by a second client device, and are configured to provide sufficient information to the client device such that the client device may calculate its location.

7. The distributed communications apparatus of claim 1, wherein the first protocol is different than the second protocol.

8. The distributed communications apparatus of claim 1, wherein the at least one location controller is located within the at least one head end unit.

9. The distributed communications apparatus of claim 1, wherein the at least one location controller comprises a plurality of location controllers, each of the plurality of location controllers located within a respective one of the plurality of RAUs.

* * * * *